US011768576B2

(12) United States Patent
Sommer et al.

(10) Patent No.: US 11,768,576 B2
(45) Date of Patent: Sep. 26, 2023

(54) DISPLAYING REPRESENTATIONS OF ENVIRONMENTS

(71) Applicant: Apple Inc., Cupertino, CA (US)

(72) Inventors: Bruno M. Sommer, Sunnyvale, CA (US); Tucker Bull Morgan, San Francisco, CA (US); Shih Sang Chiu, San Francisco, CA (US); Connor Alexander Smith, San Mateo, CA (US)

(*) Notice: Subject to any disclaimer, the term of this patent is extended or adjusted under 35 U.S.C. 154(b) by 0 days.

(21) Appl. No.: 17/351,050

(22) Filed: Jun. 17, 2021

(65) Prior Publication Data

US 2021/0311608 A1     Oct. 7, 2021

Related U.S. Application Data

(63) Continuation of application No. PCT/US2020/047186, filed on Aug. 20, 2020.
(Continued)

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/013* (2013.01); *G06F 3/017* (2013.01);
(Continued)

(58) Field of Classification Search
None
See application file for complete search history.

(56) References Cited

U.S. PATENT DOCUMENTS

2015/0234477 A1   8/2015   Abovitz et al.
2016/0026253 A1*  1/2016   Bradski ............... H04N 13/128
                                                 345/8
(Continued)

OTHER PUBLICATIONS

Traian Lavric et al., "Draft of White Paper on ARAF 2nd Edition", No. m37414, Oct. 17, 2015 (Oct. 17, 2015), 113. MPEG Meeting; Oct. 19, 2015-Oct. 23, 2015; Geneva; (Motion Picture Expert Group or ISO/IEC JTC1/SC29/WG11).
(Continued)

*Primary Examiner* — Amare Mengistu
*Assistant Examiner* — Sarvesh J Nadkarni
(74) *Attorney, Agent, or Firm* — Fernando & Partners, LLP

(57) ABSTRACT

A method includes displaying a home ER environment characterized by home ER world coordinates, including one or more diorama-view representation of one or more respective ER environments. Each diorama-view representation includes ER objects arranged in a spatial relationship according to corresponding ER world coordinates. In some implementations, in response to detecting an input directed to a first diorama-view representation, the method includes transforming the home ER environment. Transforming the home ER environment includes transforming the spatial relationship between a subset of the ER objects as a function of the home ER world coordinates and corresponding ER world coordinates. In some implementations, in response to detecting an input associated with a first one of a plurality of diorama-view representations, the method includes changing display of the first one of the plurality of diorama-view representations from a first viewing vector to a second viewing vector while maintaining an arrangement of ER objects.

24 Claims, 25 Drawing Sheets

Related U.S. Application Data

(60) Provisional application No. 62/905,692, filed on Sep. 25, 2019.

(51) Int. Cl.
*G06F 3/16* (2006.01)
*G06V 20/10* (2022.01)
*G06F 3/0482* (2013.01)

(52) U.S. Cl.
CPC ................ *G06F 3/16* (2013.01); *G06V 20/10* (2022.01); *G06F 3/0482* (2013.01)

(56) References Cited

U.S. PATENT DOCUMENTS

2016/0196596 A1    7/2016  Van Wie et al.
2018/0315248 A1*  11/2018  Bastov ................ G06F 3/04815

OTHER PUBLICATIONS

PCT International Search Report and Written Opinion dated Jan. 18, 2021, International Application No. PCT/US2020/047186, pp. 1-22.

\* cited by examiner

DISPLAYING REPRESENTATIONS OF ENVIRONMENTS

CROSS-REFERENCE TO RELATED APPLICATIONS

This application is entitled to the benefit of International App No. PCT/US2020/047186, filed on Aug. 20, 2020, which is entitled to the benefit of the filing date of U.S. Provisional Patent App. No. 62/905,692, filed on Sep. 25, 2019, both of which are hereby incorporated by reference in their entirety.

TECHNICAL FIELD

The present disclosure relates to displaying content, and, in particular, displaying respective representations of environments.

BACKGROUND

A previously available device may display content within an operating environment. In augmented reality (AR) applications, the operating environment corresponds to a physical (e.g. real-world) environment including physical objects, and the previously available device displays virtual objects overlaid on a graphical representation of the physical environment. In virtual reality (VR) applications, the operating environment corresponds to a virtual environment including purely virtual objects.

However, the device lacks a mechanism for enabling three-dimensional (3D) manipulation of the displayed content within the operating environment. The device also lacks a mechanism for displaying virtual objects such that the virtual objects and physical objects from occluding each other within the operating environment.

BRIEF DESCRIPTION OF THE DRAWINGS

For a better understanding of the various described implementations, reference should be made to the Description, below, in conjunction with the following drawings in which like reference numerals refer to corresponding parts throughout the figures.

SUMMARY

Figure 1:
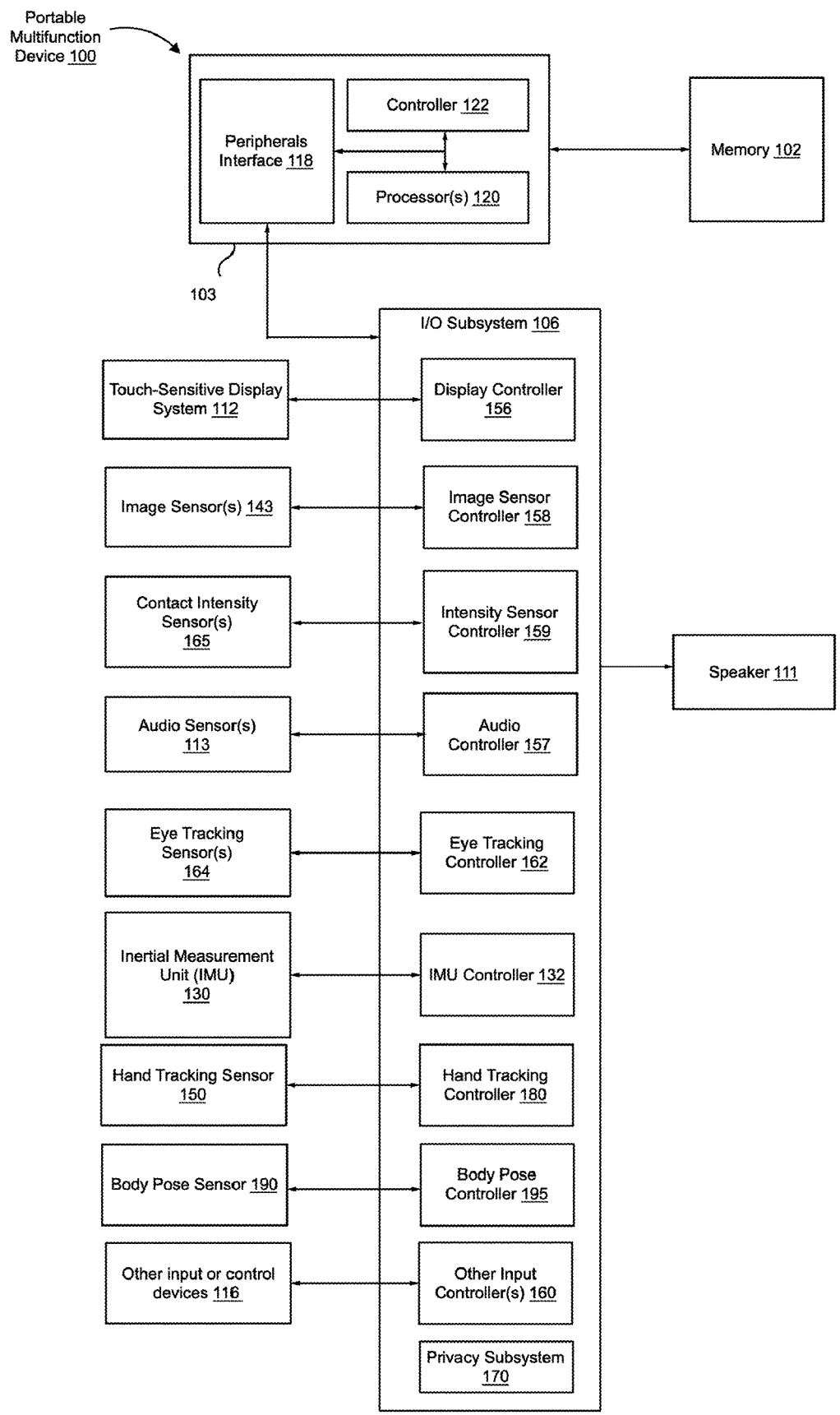
FIG. 1 is a block diagram of an example of a portable multifunction device in accordance with some implementations.

In accordance with some implementations, a method is performed at an electronic device with one or more processors, a non-transitory memory, one or more input devices, and a display device. The method includes displaying, via the display device, a home enhanced reality (ER) environment characterized by home ER world coordinates, including a first diorama-view representation of a first ER environment. The first diorama-view representation includes one or more of ER objects arranged in a spatial relationship according to first ER world coordinates. The method includes detecting, via the one or more input devices, a first input that is directed to the first diorama-view representation. The method includes, in response to detecting the first input, transforming the home ER environment by: ceasing to display the first diorama-view representation within the home ER environment, transforming the spatial relationship between a subset of the one or more ER objects as a function of the home ER world coordinates and the first ER world coordinates, and displaying, via the display device, the subset of the one or more ER objects within the home ER environment based on the transformation.

In accordance with some implementations, a method is performed at an electronic device with one or more processors, a non-transitory memory, one or more input devices, and a display device. The method includes displaying, via the display device, a plurality of diorama-view representations from a corresponding plurality of viewing vectors. The plurality of diorama-view representations corresponds to a plurality of enhanced reality (ER) environments. Each of the plurality of diorama-view representations is associated with a respective set of ER world coordinates that characterizes a respective ER environment. The plurality of diorama-view representations includes a first one of the plurality of diorama-view representations displayed from a first viewing vector. The first one of the plurality of diorama-view representations includes a first one or more of ER objects arranged according to a first set of ER world coordinates. The method includes detecting, via the one or more input devices, an input associated with the first one of the plurality of diorama-view representations. The method includes, in response to detecting the input, changing display of the first one of the plurality of diorama-view representations from the first viewing vector to a second viewing vector while maintaining the first one or more ER objects arranged according to the first set of ER world coordinates.

In accordance with some implementations, an electronic device includes one or more processors, a non-transitory memory, one or more input devices, and a display device. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

In some circumstances, a device may display one or more objects within an operating environment. In some applications, the device modifies display of a current operating environment. Modifying the current operating environment may include displaying different (e.g., new) virtual objects at respective predetermined locations within the current operating environment, independent of user input. Displaying a virtual object at a predetermined location within the current operating environment is problematic because the virtual object and a physical (e.g., real-world) object that is also within the current operating environment may obstruct (e.g., occlude) each other, degrading the functionality provided by the current operating environment.

By contrast, various implementations include systems, methods, and electronic devices that, in response to detecting a first input directed to a first diorama-view representation of a first ER environment, transforming a subset of ER objects included in the first diorama-view representation into the home ER environment as a function of home ER world coordinates and first ER world coordinates. In some implementations, the method includes moving the subset of ER objects in response to detecting a second input. For example, in some implementations, the method includes moving the subset of ER objects relative to physical objects within the home ER environment. Accordingly, occlusions (e.g., obstructions) between physical objects and ER objects are negated, enabling a richer set of functionality with respect to the home ER environment.

In some circumstances, a device may display content within an operating environment. For example, in conventional video conference applications, the operating environment corresponds to a shared communication environment. The device displays remotely-located individuals associated with the shared communication environment based on respective recorded video streams of the individuals. Accordingly, the individuals may graphically interact with each other. The device displays the content within the operating environment in two-dimensions (2D), such as a flat 2D video stream associated with a video conference. However, the device lacks a mechanism for enabling three-dimensional (3D) manipulation of the displayed content within the operating environment.

By contrast, various implementations include methods, systems, and electronic devices that enable changing a perspective view of a first one of a plurality of displayed diorama-view representations based on a user input. The plurality of diorama-view representations corresponds to a plurality of enhanced reality (ER) environments. Each of the plurality of diorama-view representations is associated with a respective set of ER world coordinates that characterizes a respective ER environment. Based on the user input, an electronic device changes the perspective view of the first one of the plurality of diorama-view representations while maintaining the previous arrangement of ER objects therein according to a respective set of ER world coordinates. Accordingly, the first one of the plurality of diorama-view representations may be manipulated from a 3D perspective, enabling a richer set of functionality with respect to the ER environments.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

Various examples of electronic systems and techniques for using such systems in relation to various enhanced reality technologies are described.

A physical setting refers to a world with which various persons can sense and/or interact without use of electronic systems. Physical settings, such as a physical park, include physical elements, such as, for example, physical wildlife, physical trees, and physical plants. Persons can directly sense and/or otherwise interact with the physical setting, for example, using one or more senses including sight, smell, touch, taste, and hearing.

An enhanced reality (ER) setting or a computer-generated reality (CGR) setting, in contrast to a physical setting, refers to an entirely (or partly) computer-produced setting that various persons, using an electronic system, can sense and/or otherwise interact with. In ER/CGR, a person's movements are in part monitored, and, responsive thereto, at least one attribute corresponding to at least one virtual object in the ER/CGR setting is changed in a manner that is consistent with one or more physical laws. For example, in response to an ER/CGR system detecting a person looking upward, the ER/CGR system may adjust various audio and graphics presented to the person in a manner consistent with how such sounds and appearances would change in a physical setting. Adjustments to attribute(s) of virtual object (s) in an ER/CGR setting also may be made, for example, in response to representations of movement (e.g., voice commands).

A person may sense and/or interact with an ER/CGR object using one or more senses, such as sight, smell, taste, touch, and sound. For example, a person may sense and/or interact with objects that create a multi-dimensional or spatial acoustic setting. Multi-dimensional or spatial acoustic settings provide a person with a perception of discrete acoustic sources in multi-dimensional space. Such objects may also enable acoustic transparency, which may selectively incorporate audio from a physical setting, either with or without computer-produced audio. In some ER/CGR settings, a person may sense and/or interact with only acoustic objects.

Virtual reality (VR) is one example of ER/CGR. A VR setting refers to an enhanced setting that is configured to only include computer-produced sensory inputs for one or more senses. A VR setting includes a plurality of virtual objects that a person may sense and/or interact with. A person may sense and/or interact with virtual objects in the VR setting through a simulation of at least some of the person's actions within the computer-produced setting, and/or through a simulation of the person or her presence within the computer-produced setting.

Mixed reality (MR) is another example of ER/CGR. An MR setting refers to an enhanced setting that is configured to integrate computer-produced sensory inputs (e.g., virtual objects) with sensory inputs from the physical setting, or a representation of sensory inputs from the physical setting. On a reality spectrum, an MR setting is between, but does not include, a completely physical setting at one end and a VR setting at the other end.

In some MR settings, computer-produced sensory inputs may be adjusted based on changes to sensory inputs from the physical setting. Moreover, some electronic systems for presenting MR settings may detect location and/or orientation with respect to the physical setting to enable interaction between real objects (i.e., physical elements from the physical setting or representations thereof) and virtual objects. For example, a system may detect movements and adjust computer-produced sensory inputs accordingly, so that, for example, a virtual tree appears fixed with respect to a physical structure.

Augmented reality (AR) is an example of MR. An AR setting refers to an enhanced setting where one or more virtual objects are superimposed over a physical setting (or representation thereof). As an example, an electronic system may include an opaque display and one or more imaging sensors for capturing video and/or images of a physical setting. Such video and/or images may be representations of the physical setting, for example. The video and/or images are combined with virtual objects, wherein the combination is then displayed on the opaque display. The physical setting may be viewed by a person, indirectly, via the images and/or video of the physical setting. The person may thus observe the virtual objects superimposed over the physical setting. When a system captures images of a physical setting, and displays an AR setting on an opaque display using the captured images, the displayed images are called a video pass-through. Alternatively, a transparent or semi-transparent display may be included in an electronic system for displaying an AR setting, such that an individual may view the physical setting directly through the transparent or semi-transparent displays. Virtual objects may be displayed on the semi-transparent or transparent display, such that an individual observes virtual objects superimposed over a physical setting. In yet another example, a projection system may be utilized in order to project virtual objects onto a physical setting. For example, virtual objects may be projected on a physical surface, or as a holograph, such that an individual observes the virtual objects superimposed over the physical setting.

An AR setting also may refer to an enhanced setting in which a representation of a physical setting is modified by computer-produced sensory data. As an example, at least a portion of a representation of a physical setting may be graphically modified (e.g., enlarged), so that the modified portion is still representative of (although not a fully-reproduced version of) the originally captured image(s). Alternatively, in providing video pass-through, one or more sensor images may be modified in order to impose a specific viewpoint different than a viewpoint captured by the image sensor(s). As another example, portions of a representation of a physical setting may be altered by graphically obscuring or excluding the portions.

Augmented virtuality (AV) is another example of MR. An AV setting refers to an enhanced setting in which a virtual or computer-produced setting integrates one or more sensory inputs from a physical setting. Such sensory input(s) may include representations of one or more characteristics of a physical setting. A virtual object may, for example, incorporate a color associated with a physical element captured by imaging sensor(s). Alternatively, a virtual object may adopt characteristics consistent with, for example, current weather conditions corresponding to a physical setting, such as weather conditions identified via imaging, online weather information, and/or weather-related sensors. As another example, an AR park may include virtual structures, plants, and trees, although animals within the AR park setting may include features accurately reproduced from images of physical animals.

Various systems allow persons to sense and/or interact with ER/CGR settings. For example, a head mounted system may include one or more speakers and an opaque display. As another example, an external display (e.g., a smartphone) may be incorporated within a head mounted system. The head mounted system may include microphones for capturing audio of a physical setting, and/or image sensors for capturing images/video of the physical setting. A transparent or semi-transparent display may also be included in the head mounted system. The semi-transparent or transparent display may, for example, include a substrate through which light (representative of images) is directed to a person's eyes. The display may also incorporate LEDs, OLEDs, liquid crystal on silicon, a laser scanning light source, a digital light projector, or any combination thereof. The substrate through which light is transmitted may be an optical reflector, holographic substrate, light waveguide, optical combiner, or any combination thereof. The transparent or semi-transparent display may, for example, transition selectively between a transparent/semi-transparent state and an opaque state. As another example, the electronic system may be a projection-based system. In a projection-based system, retinal projection may be used to project images onto a person's retina. Alternatively, a projection-based system also may project virtual objects into a physical setting, for example, such as projecting virtual objects as a holograph or onto a physical surface. Other examples of ER/CGR systems include windows configured to display graphics, headphones, earphones, speaker arrangements, lenses configured to display graphics, heads up displays, automotive windshields configured to display graphics, input mechanisms (e.g., controllers with or without haptic functionality), desktop or laptop computers, tablets, or smartphones.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a touch-sensitive display system 112, an inertial measurement unit (IMU) 130, image sensor(s) 143 (e.g., camera), contact intensity sensor(s) 165, audio sensor (s) 113 (e.g., microphone), eye tracking sensor(s) 164 (e.g., included within a head-mountable device (HMD)), a hand tracking sensor 150, a body pose sensor 190, and other input or control device(s) 116. In some implementations, the electronic device 100 corresponds to one of a mobile phone, tablet, laptop, wearable computing device, head-mountable device (HMD), head-mountable enclosure (e.g. the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the touch-sensitive display system 112 and the other input or control devices 116, with the peripherals interface 118. The I/O subsystem 106 optionally includes a display controller 156, an image sensor controller 158, an intensity sensor controller 159, an audio controller 157, an eye tracking controller 162, one or more input controllers 160 for other input or control devices, an IMU controller 132, a hand tracking controller 180, a body pose controller 195, and a privacy subsystem 170. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a physical environment.

The touch-sensitive display system 112 provides an input interface and an output interface between the electronic device 100 and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor, or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example implementation, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other implementations. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112.

The user optionally makes contact with the touch-sensitive display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within a HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the back of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The hand tracking sensor 150 obtains hand tracking data indicative of a position of a hand of a user. In various implementations, the electronic device 100 utilizes the hand tracking data in order to manipulate display of a diorama-view representation of an ER environment. For example, in some implementations, the electronic device 100 moves the diorama-view representation in order to track the current position of the hand of the user. As another example, the electronic device The body pose sensor 190 obtains body pose data indicative of a position of a head or body of a user. In various implementations, the electronic device 100 utilizes the body pose data in order to manipulate display of a diorama-view representation of an ER environment. For example, the body pose data indicates the user is turning his/her head sideways, and the electronic device 100 accordingly manipulates the perspective view of the diorama-view representation of the ER environment.

In various implementations, the electronic device 100 includes a privacy subsystem 170 that includes one or more privacy setting filters associated with user information, such as user information included in the eye gaze data and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically). As yet another example, the privacy system 170 denies access to a first individual having a first access level that does not satisfy an access level criterion that is associated with an ER session, and allows access to a second individual having a second access level that satisfies the access level criterion.

Figure 2A:
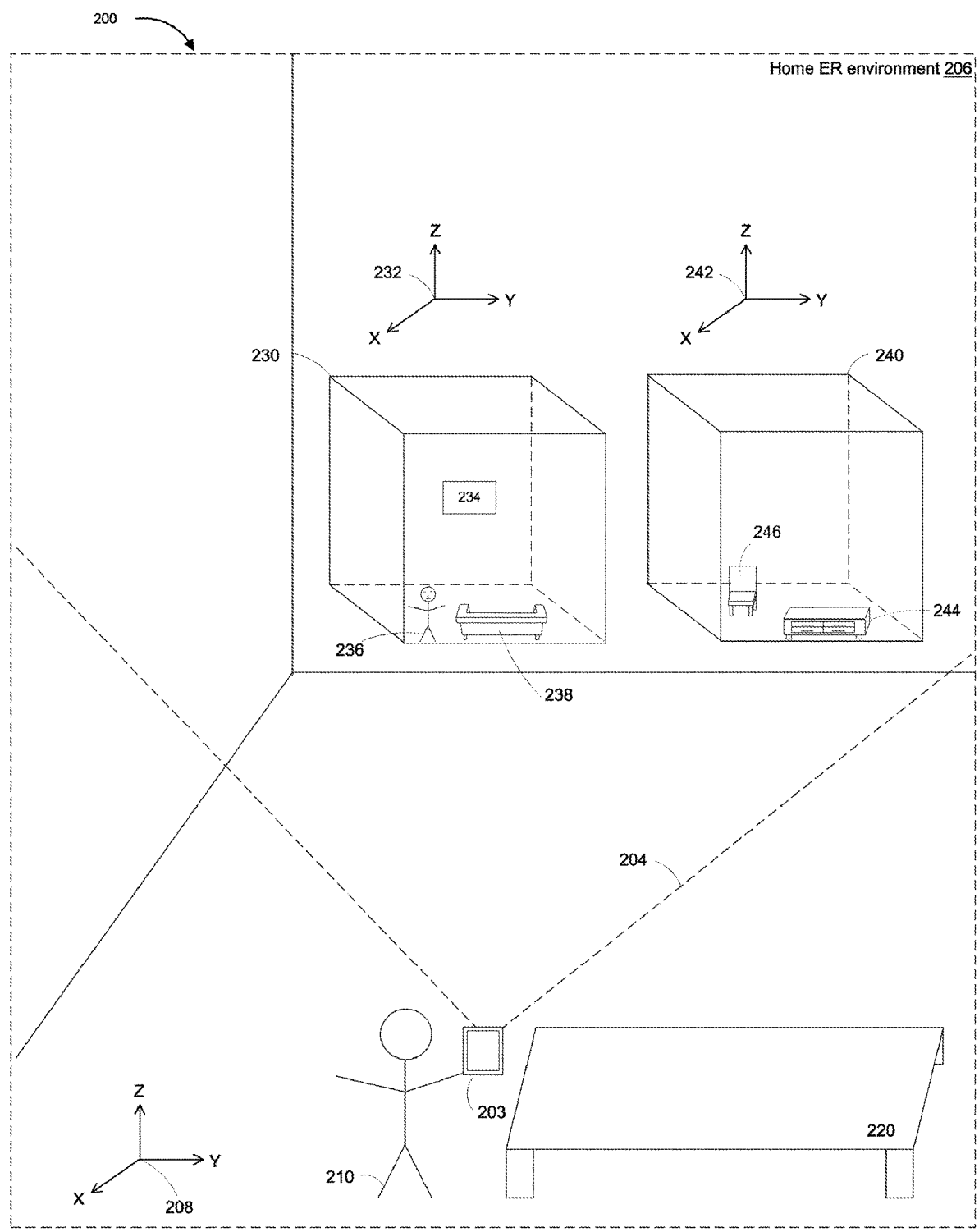
FIGS. 2A-2V are examples of an operating environment in accordance with some implementations.
Figure 2B:
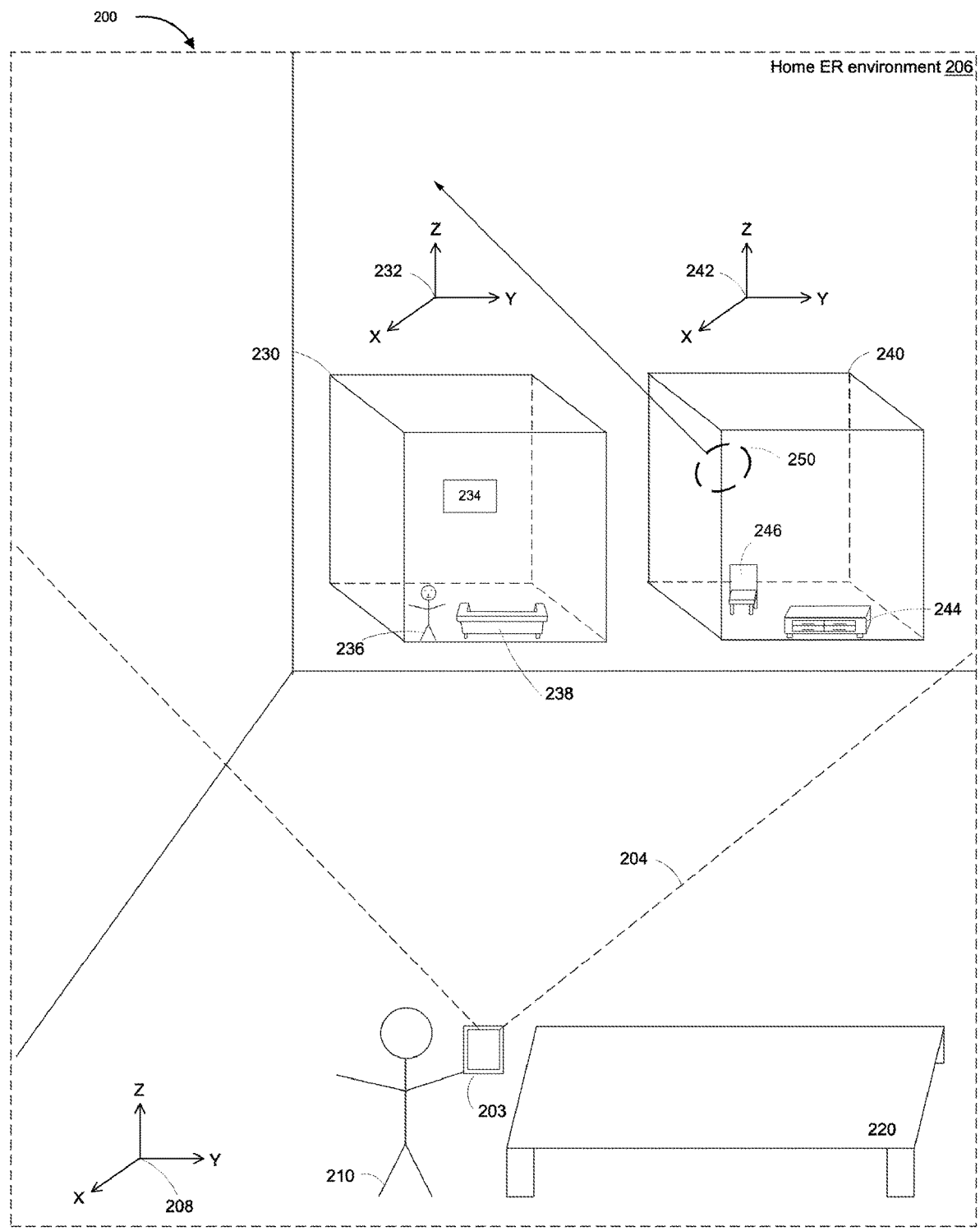
Figure 2C:
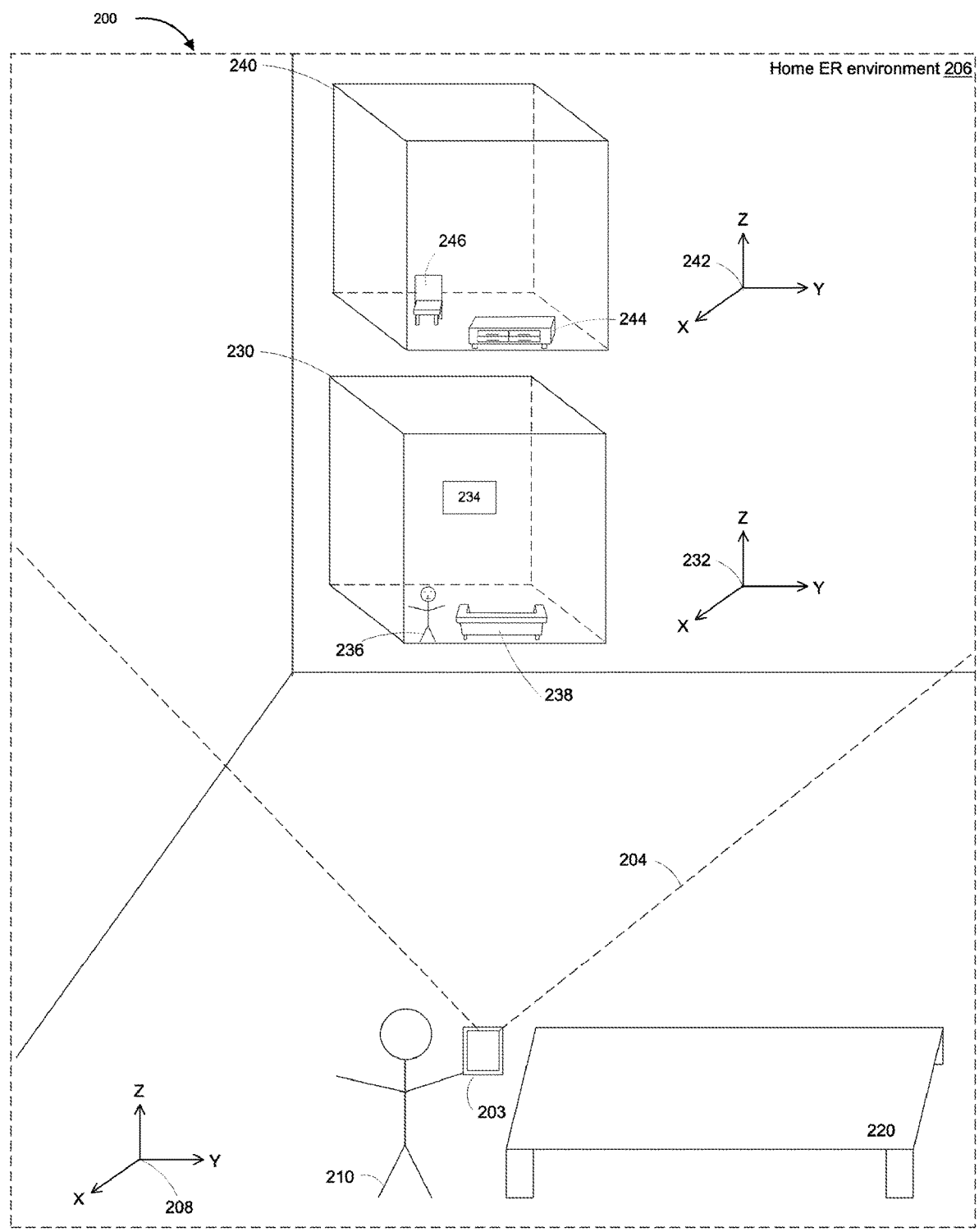
Figure 2D:
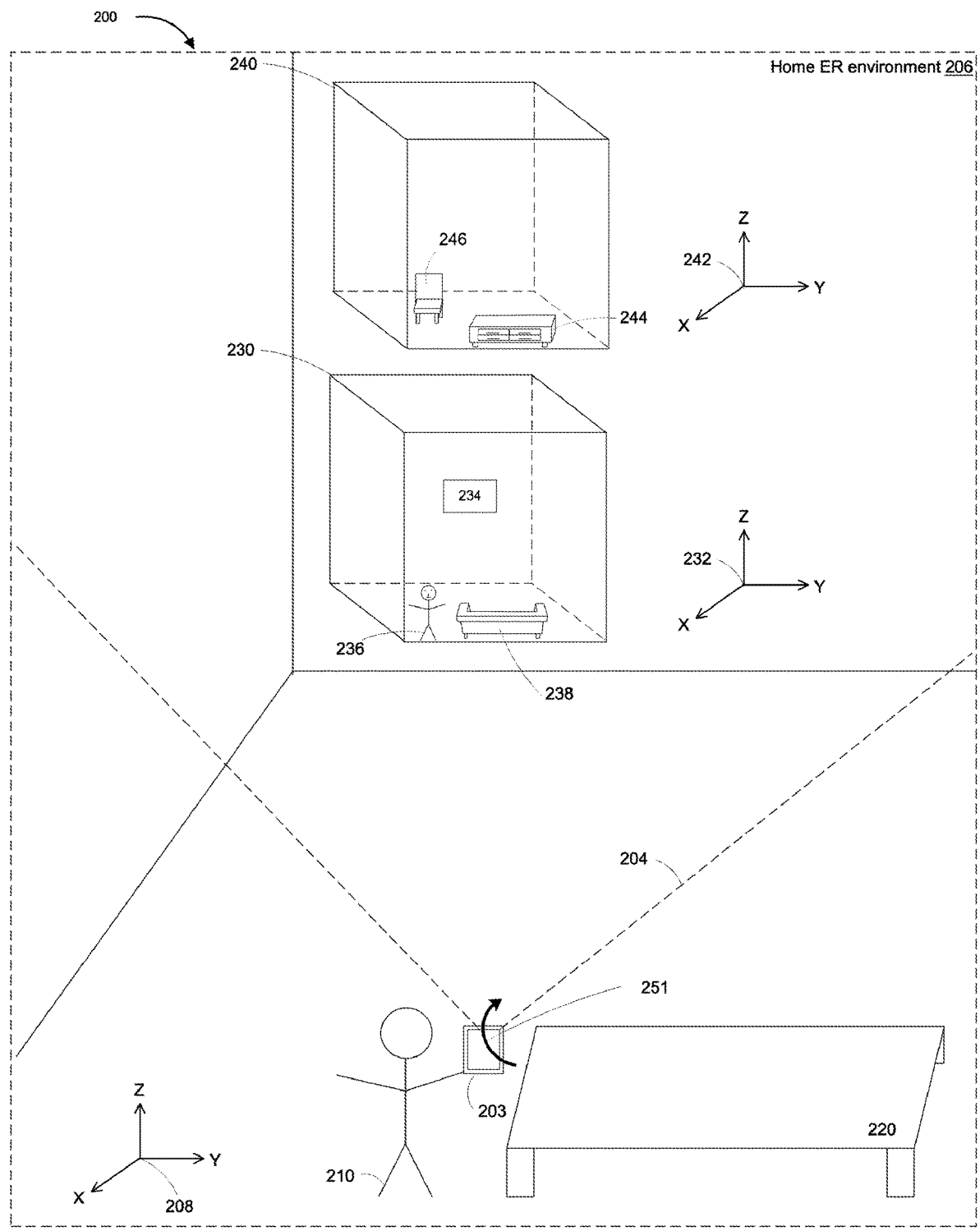
Figure 2E:
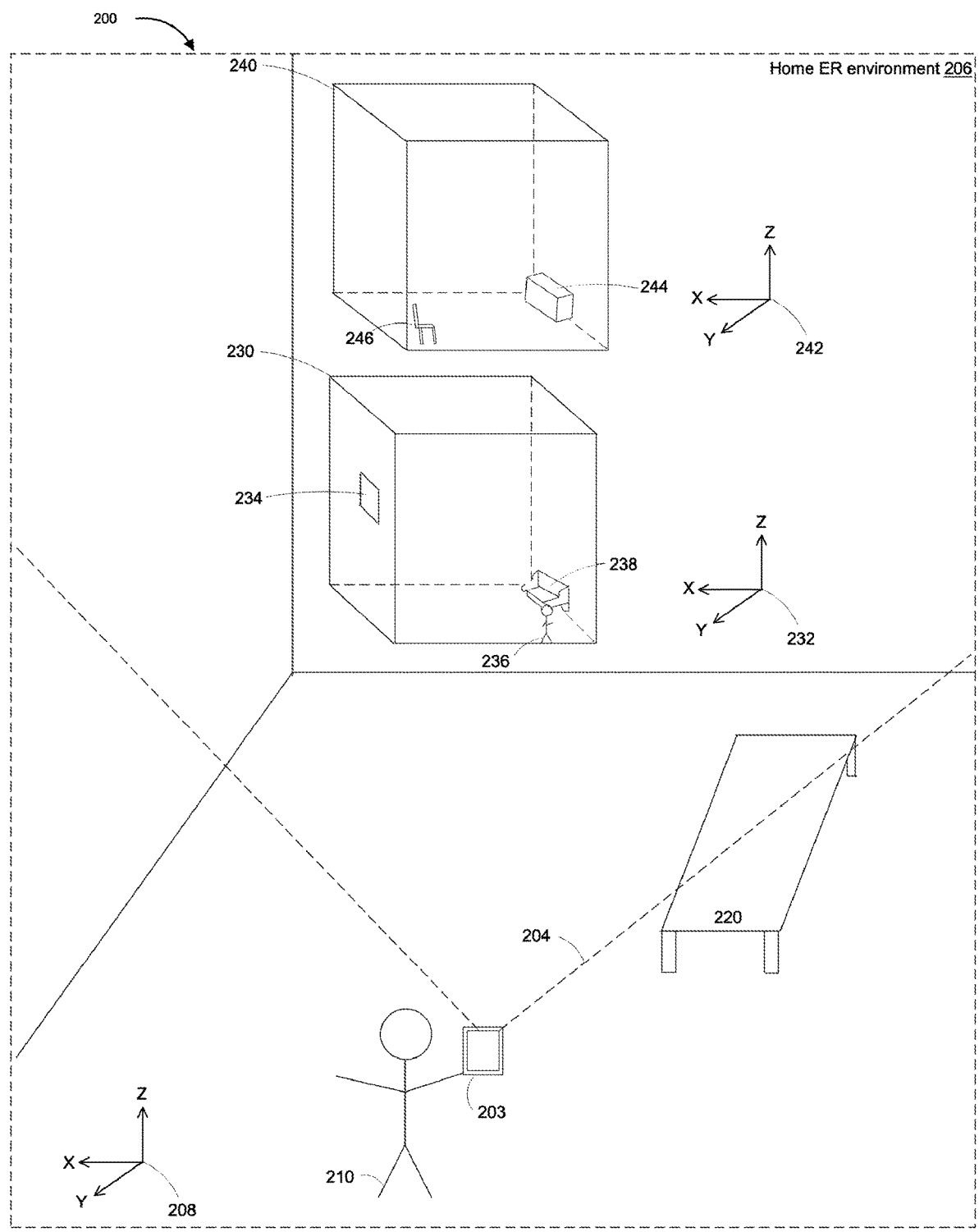
Figure 2F:
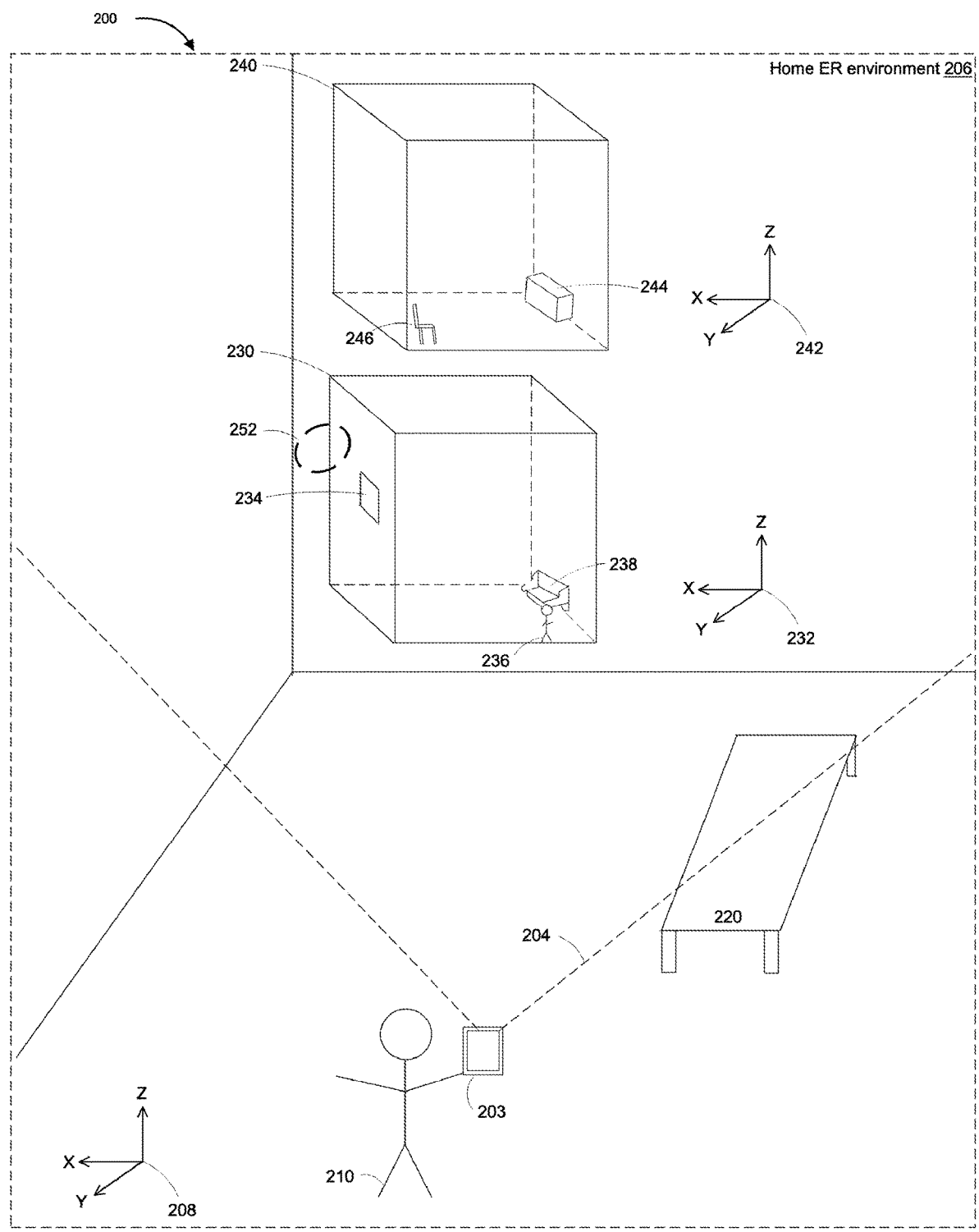
Figure 2G:
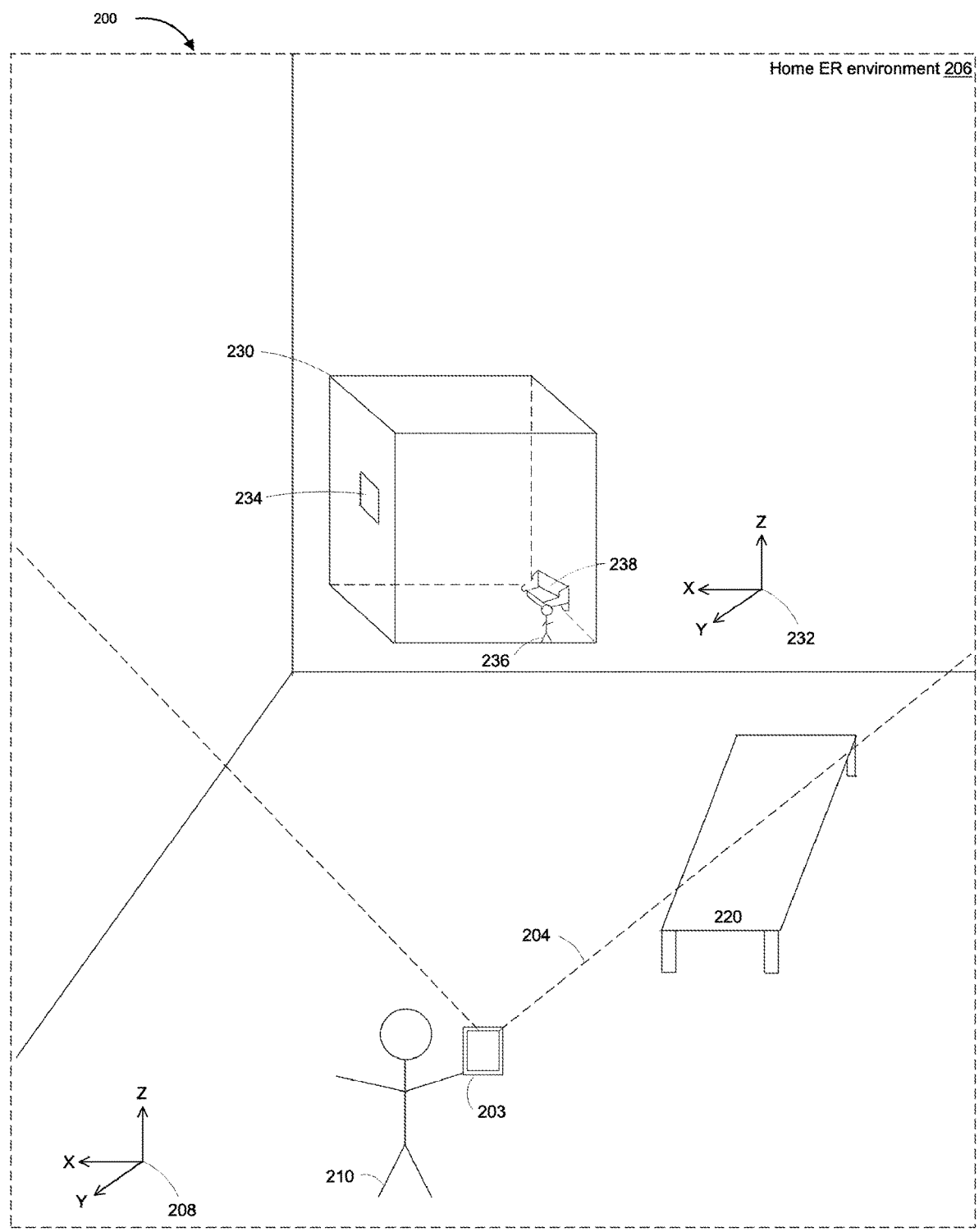
Figure 2H:
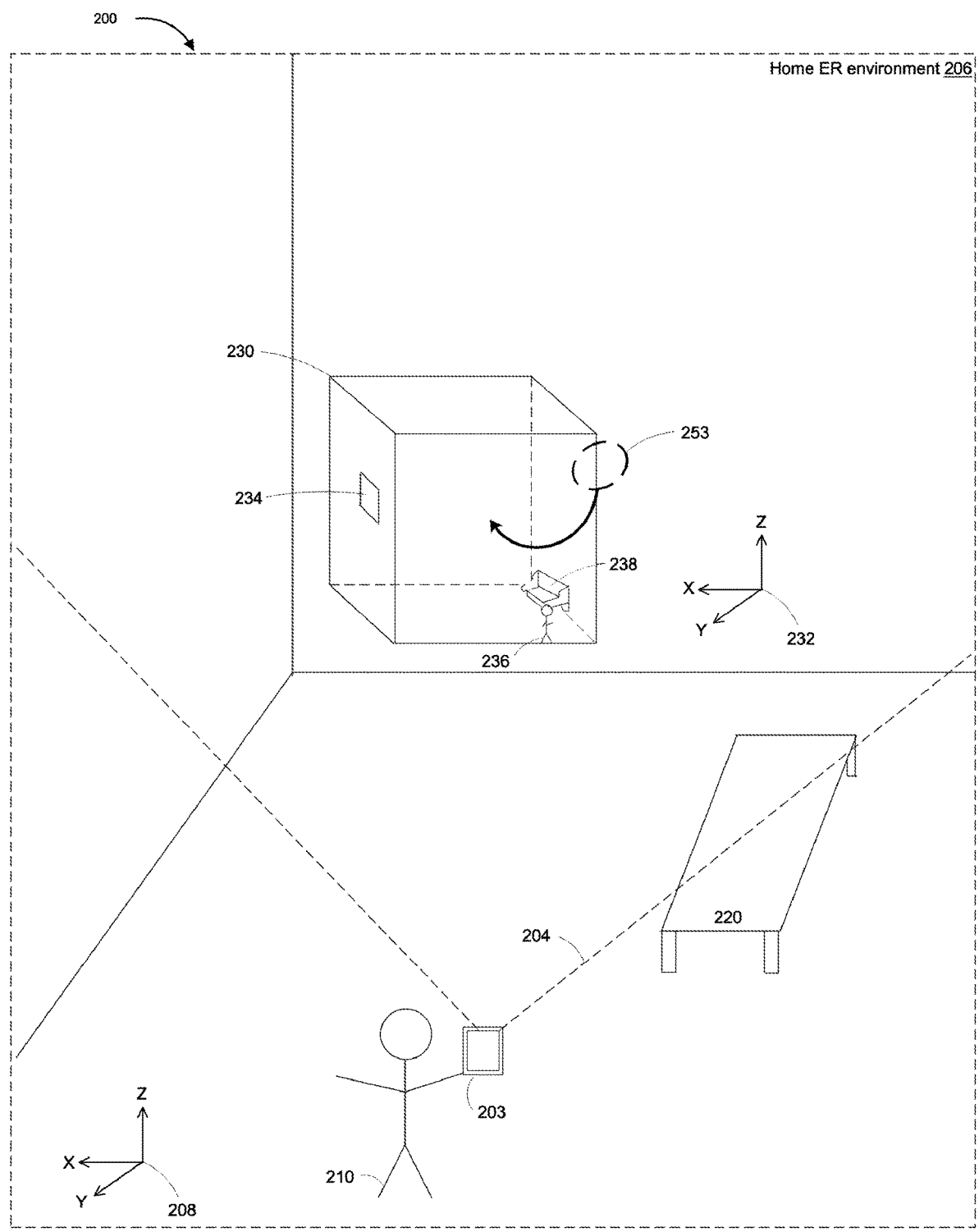
Figure 2I:
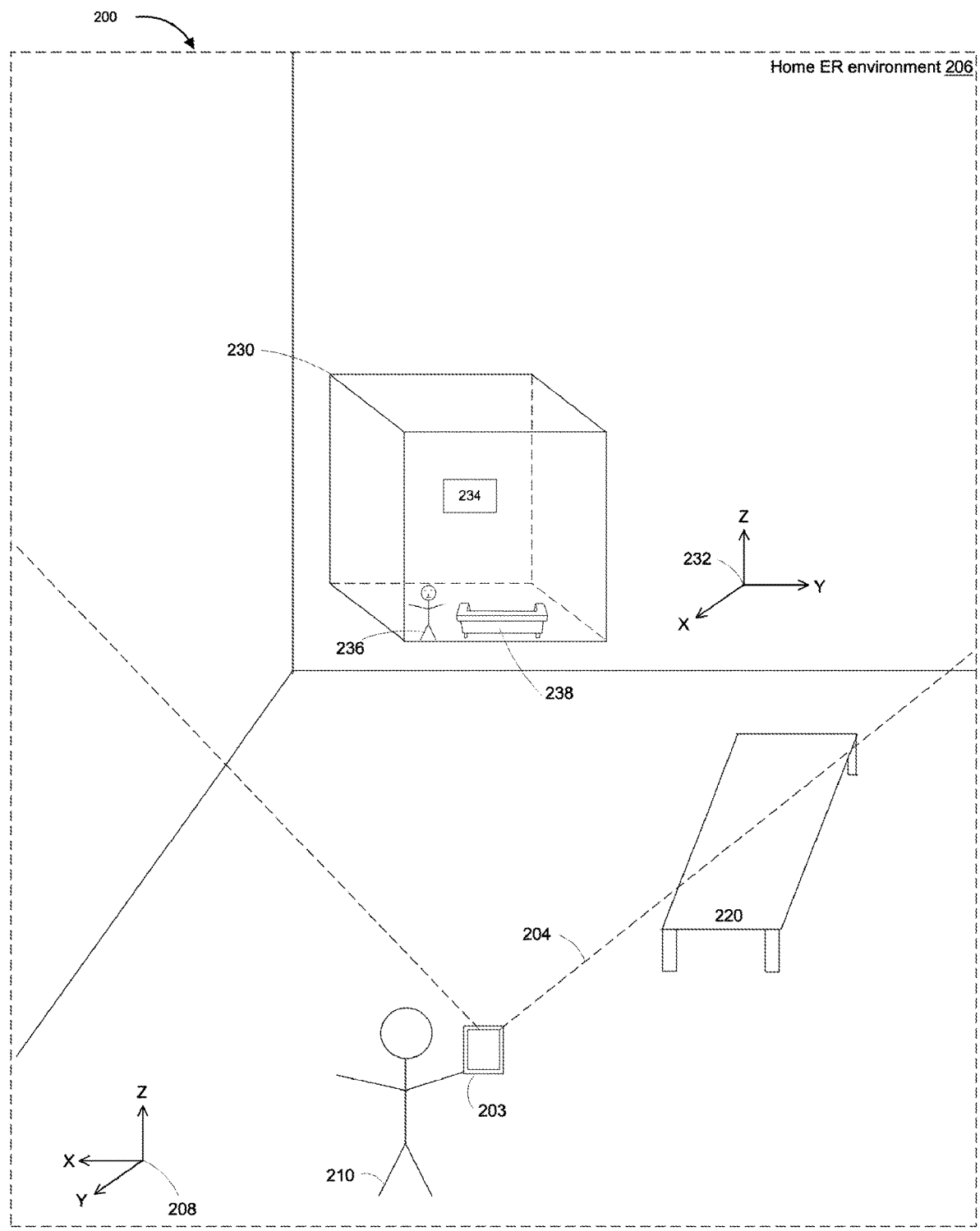
Figure 2J:
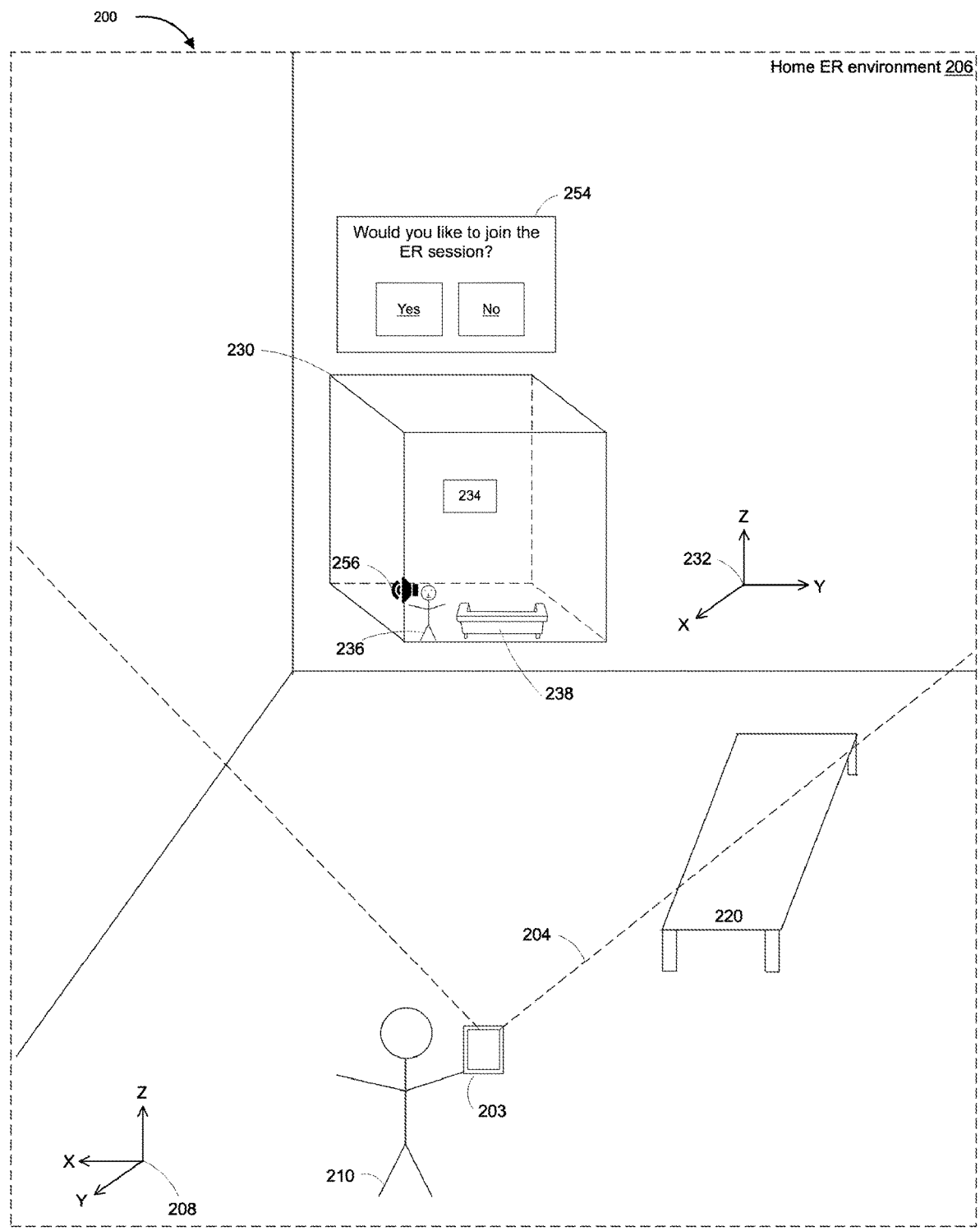
Figure 2K:
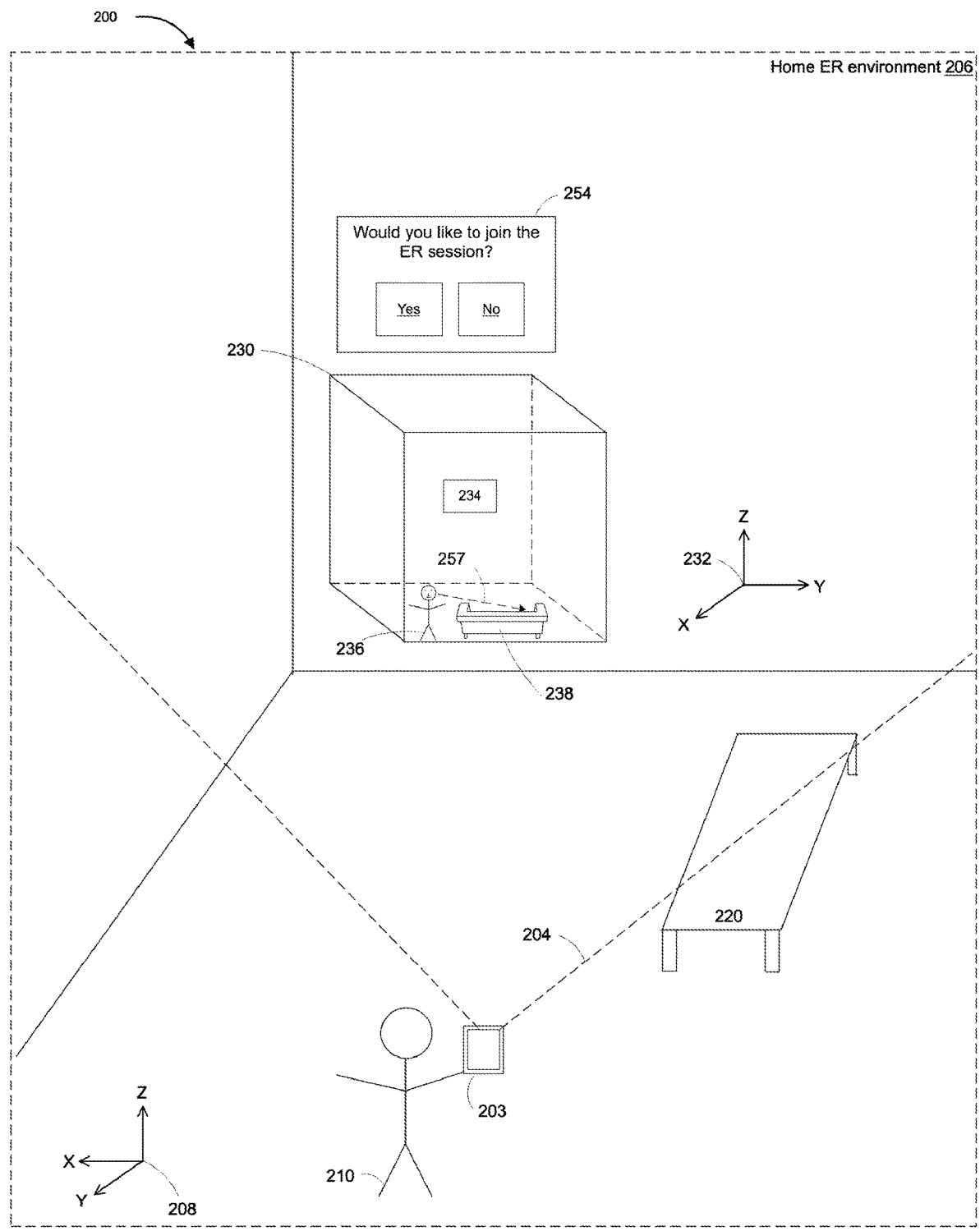
Figure 2L:
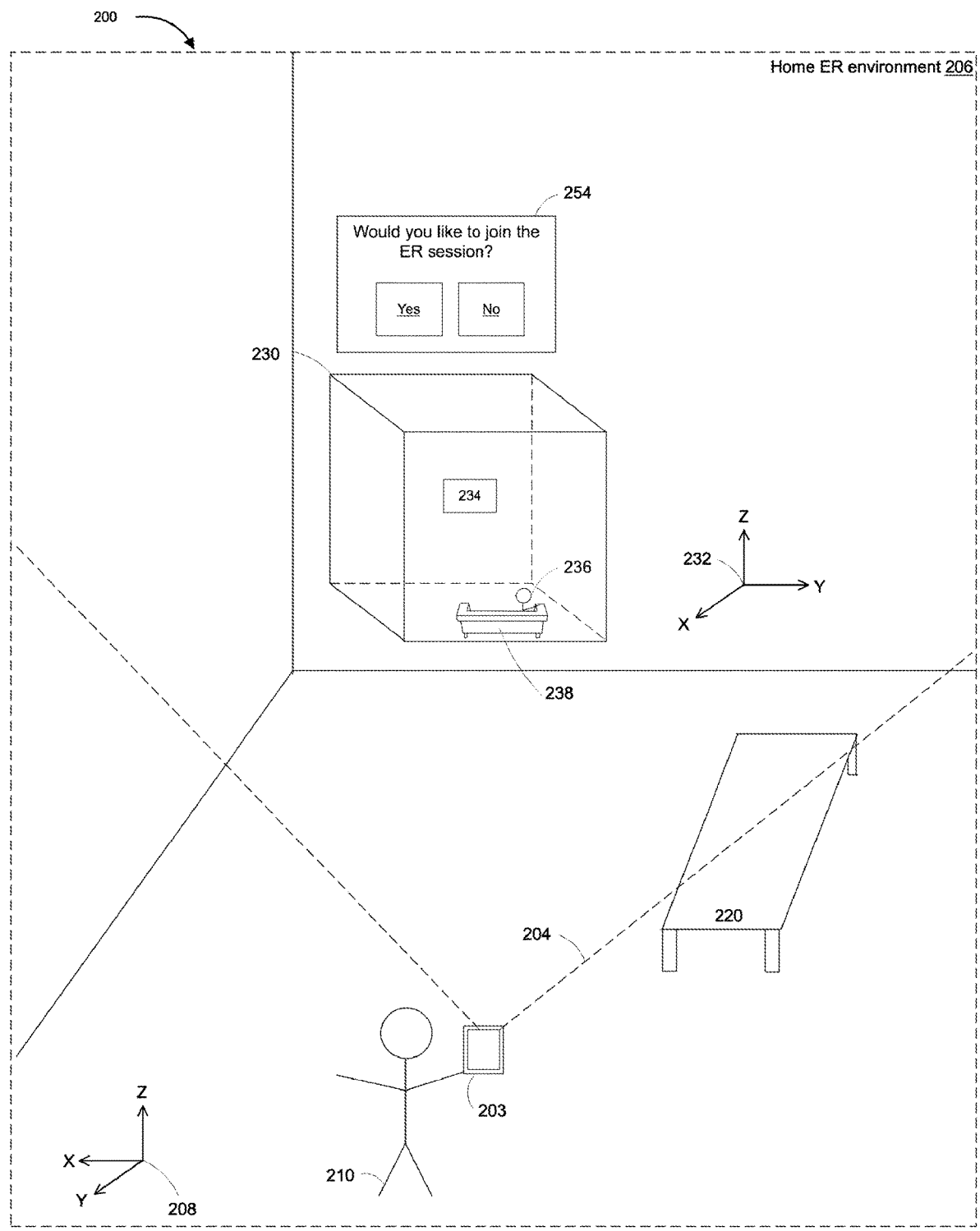
Figure 2M:
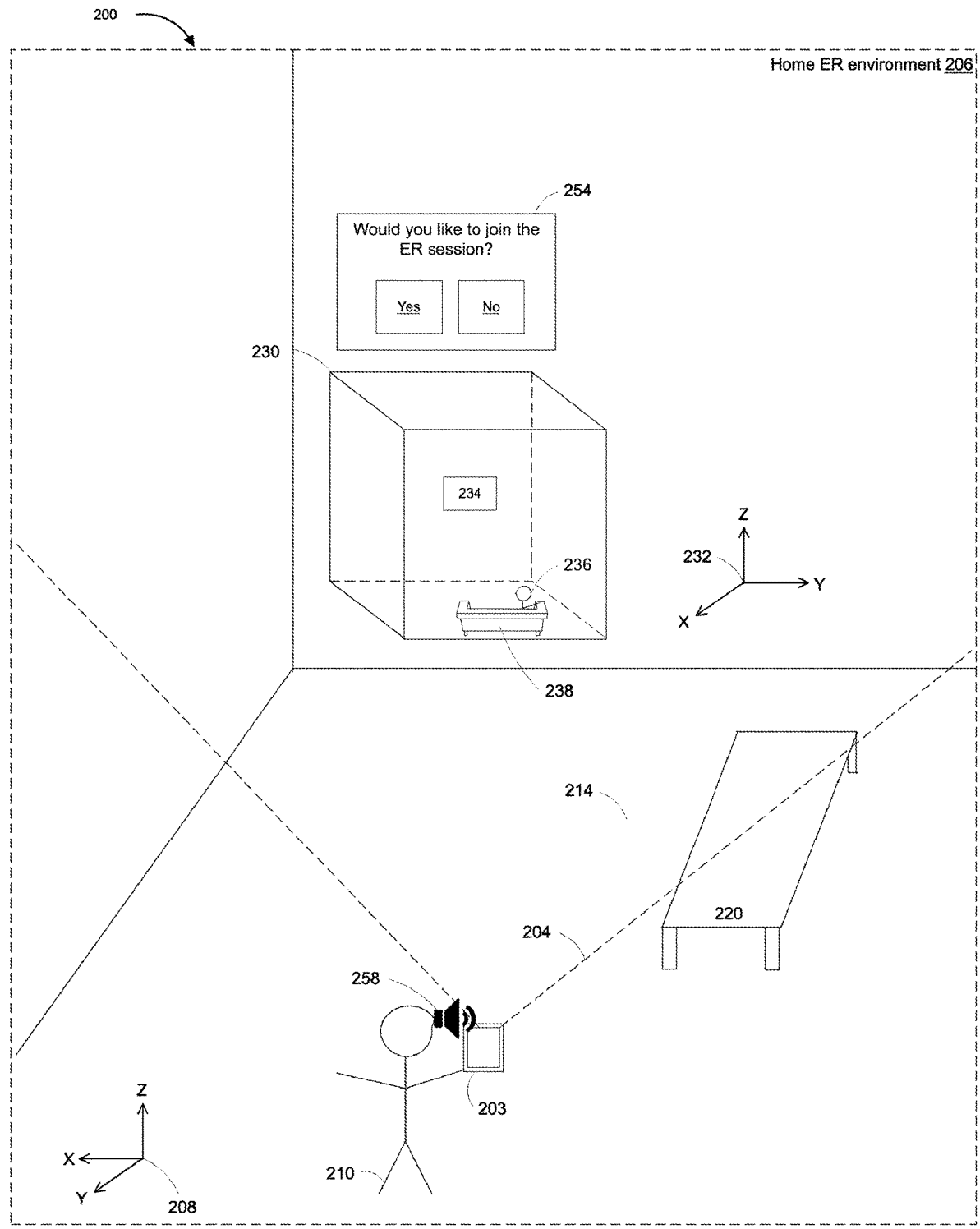
Figure 2N:
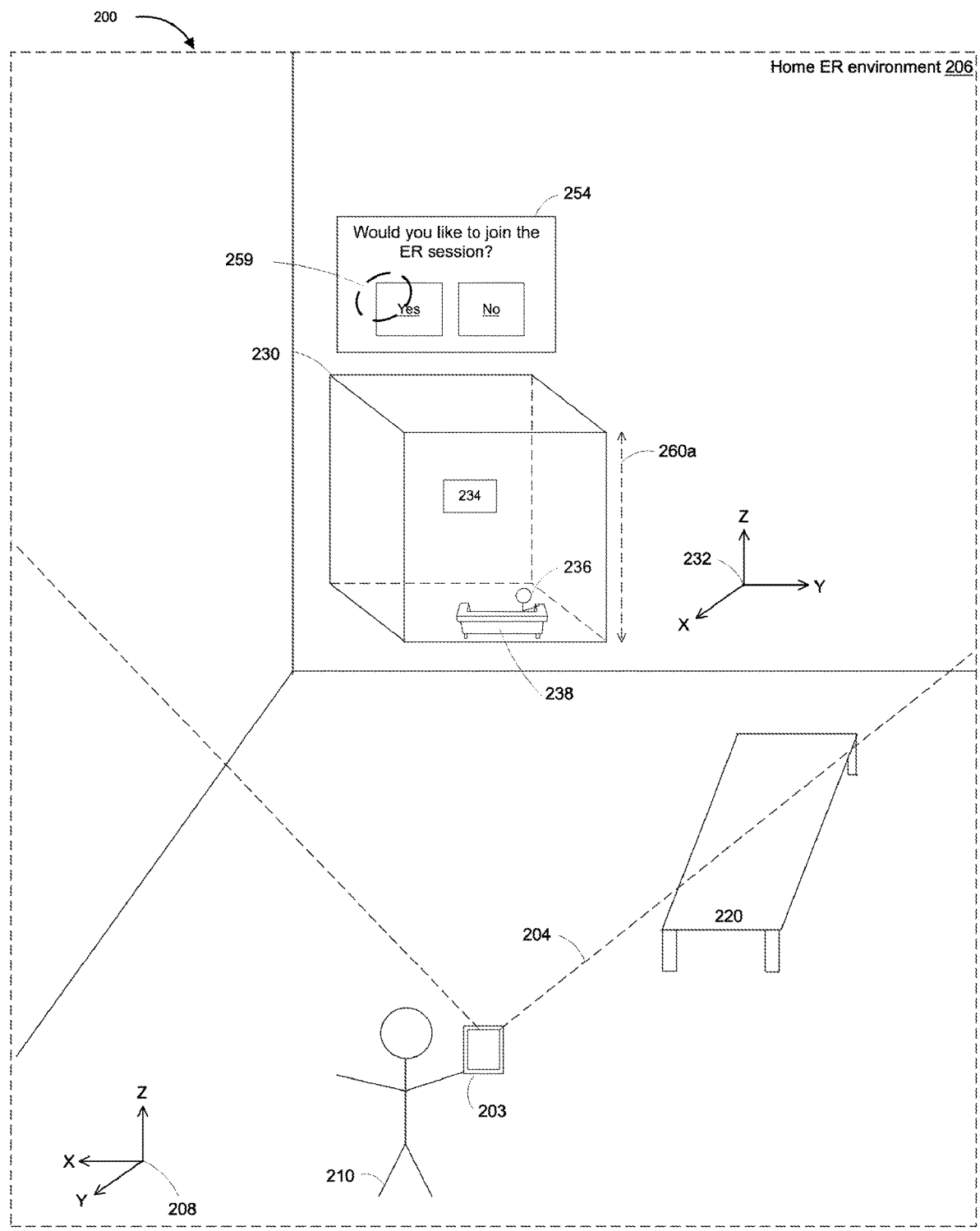
Figure 2O:
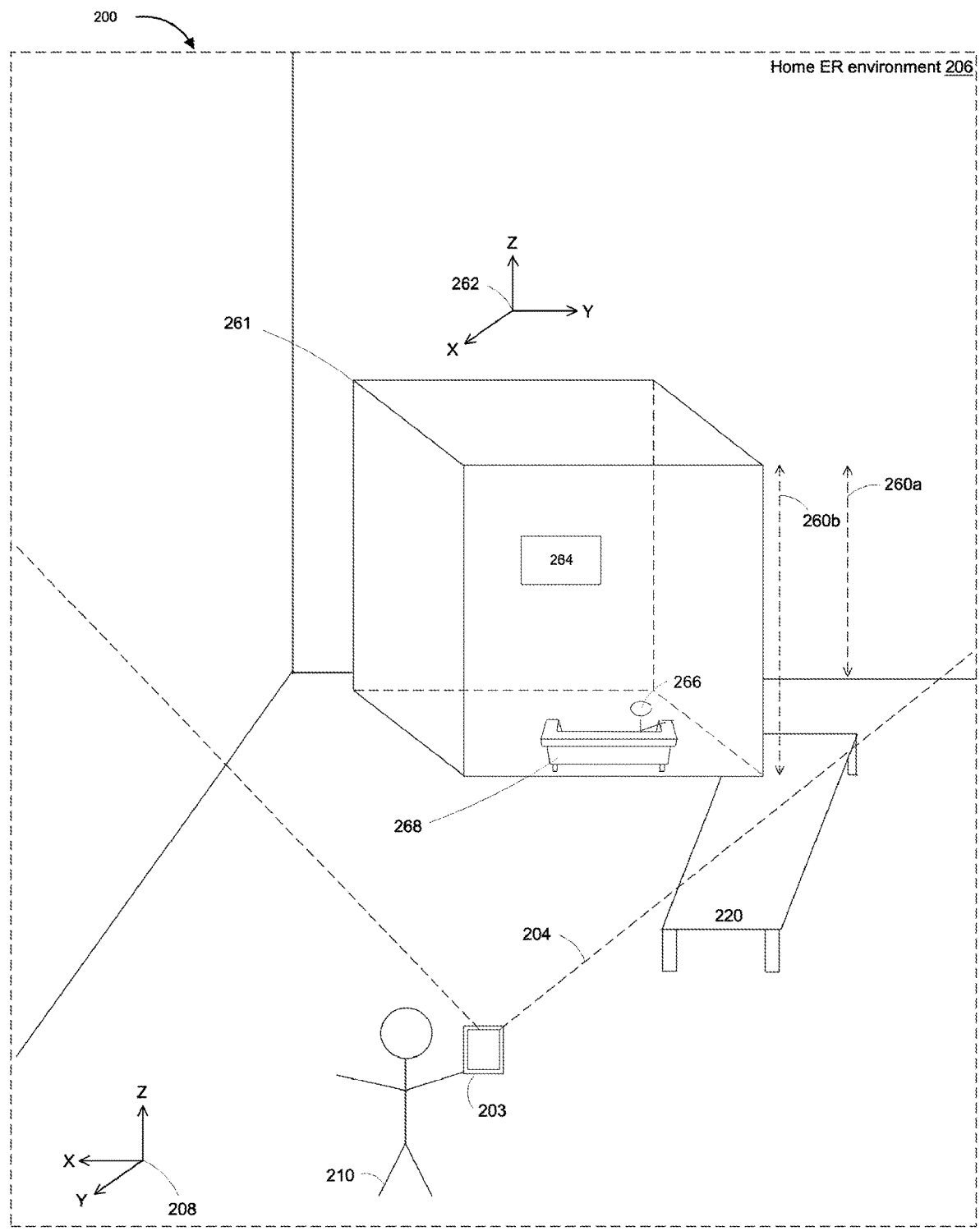
Figure 2P:
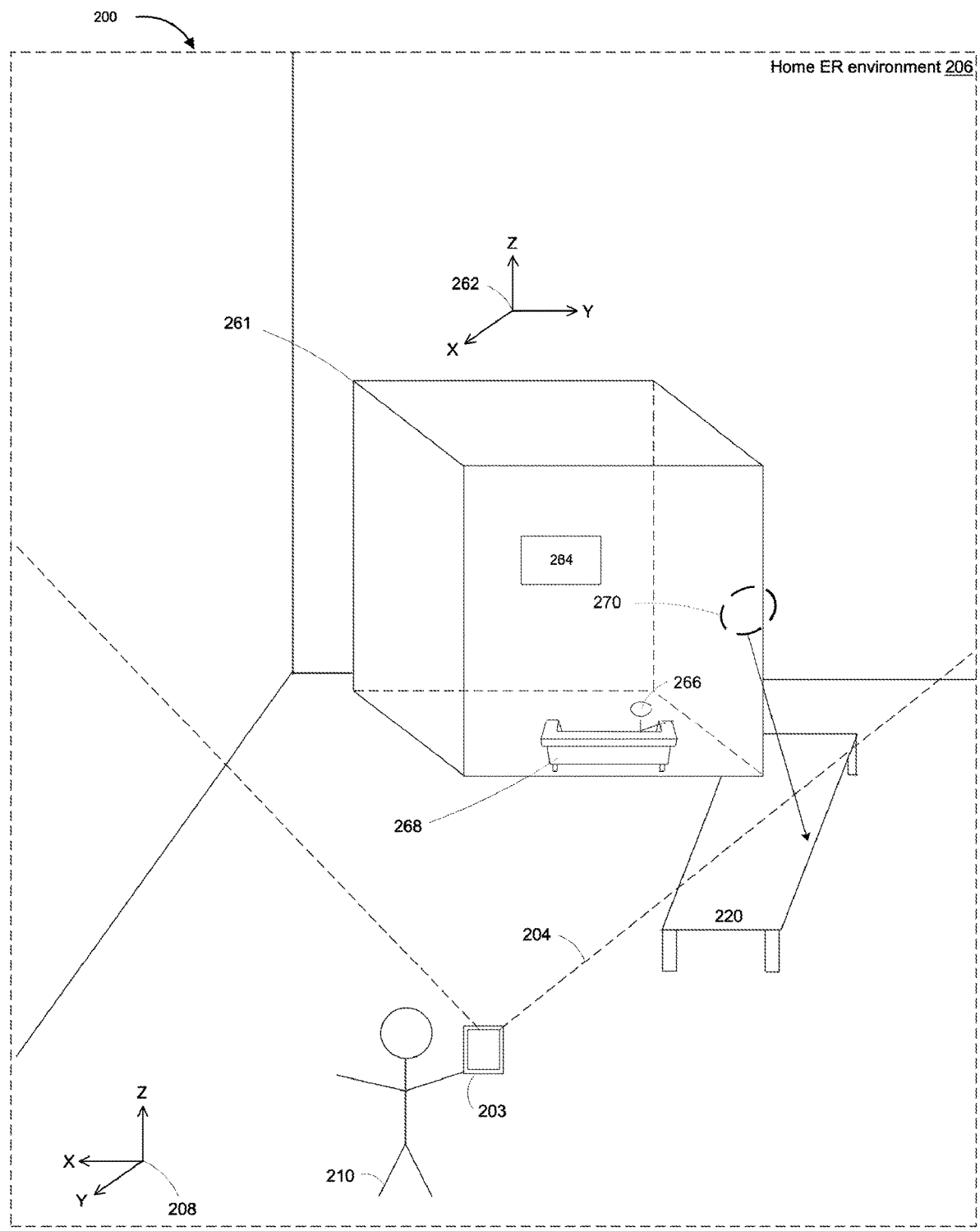
Figure 2Q:
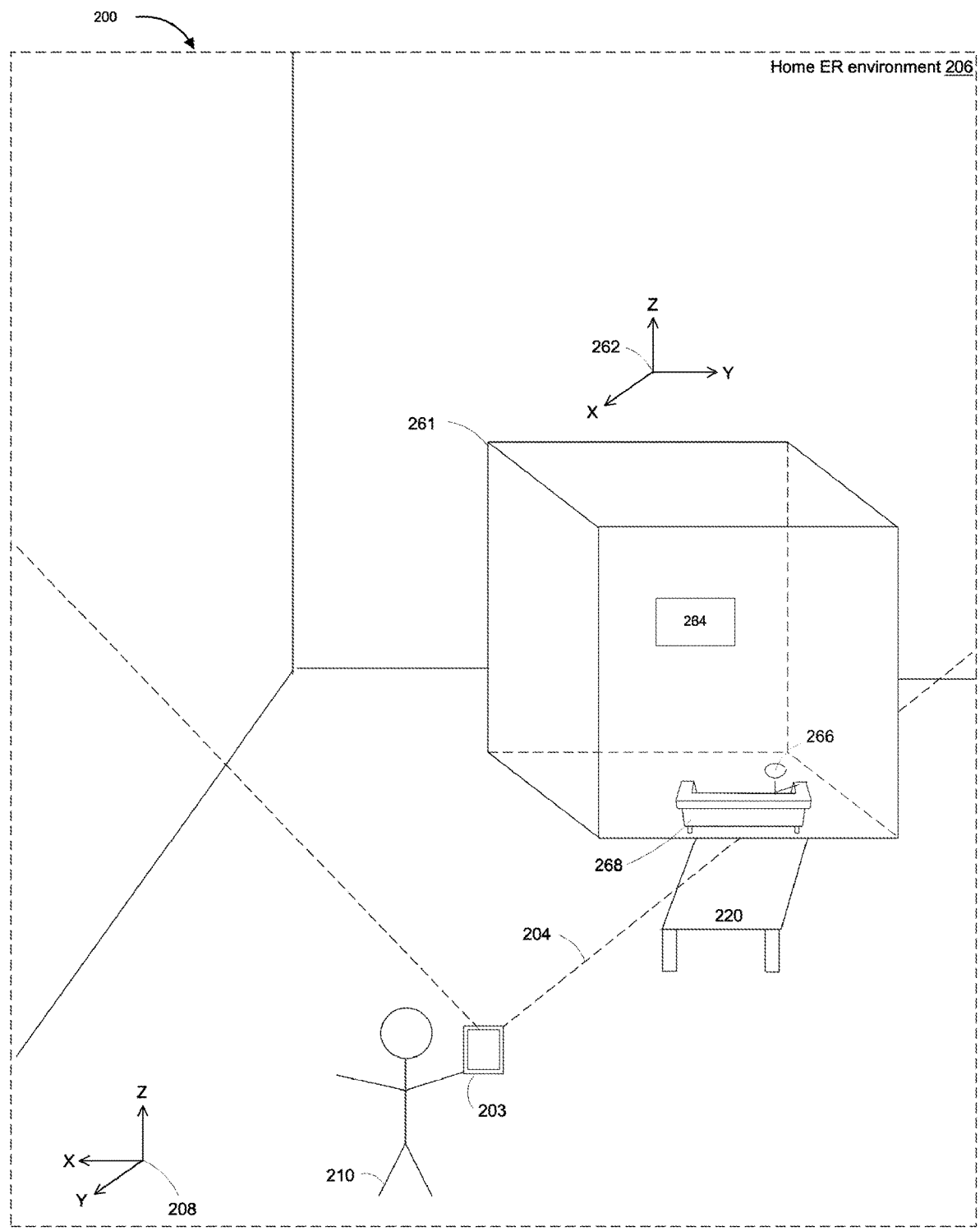
Figure 2R:
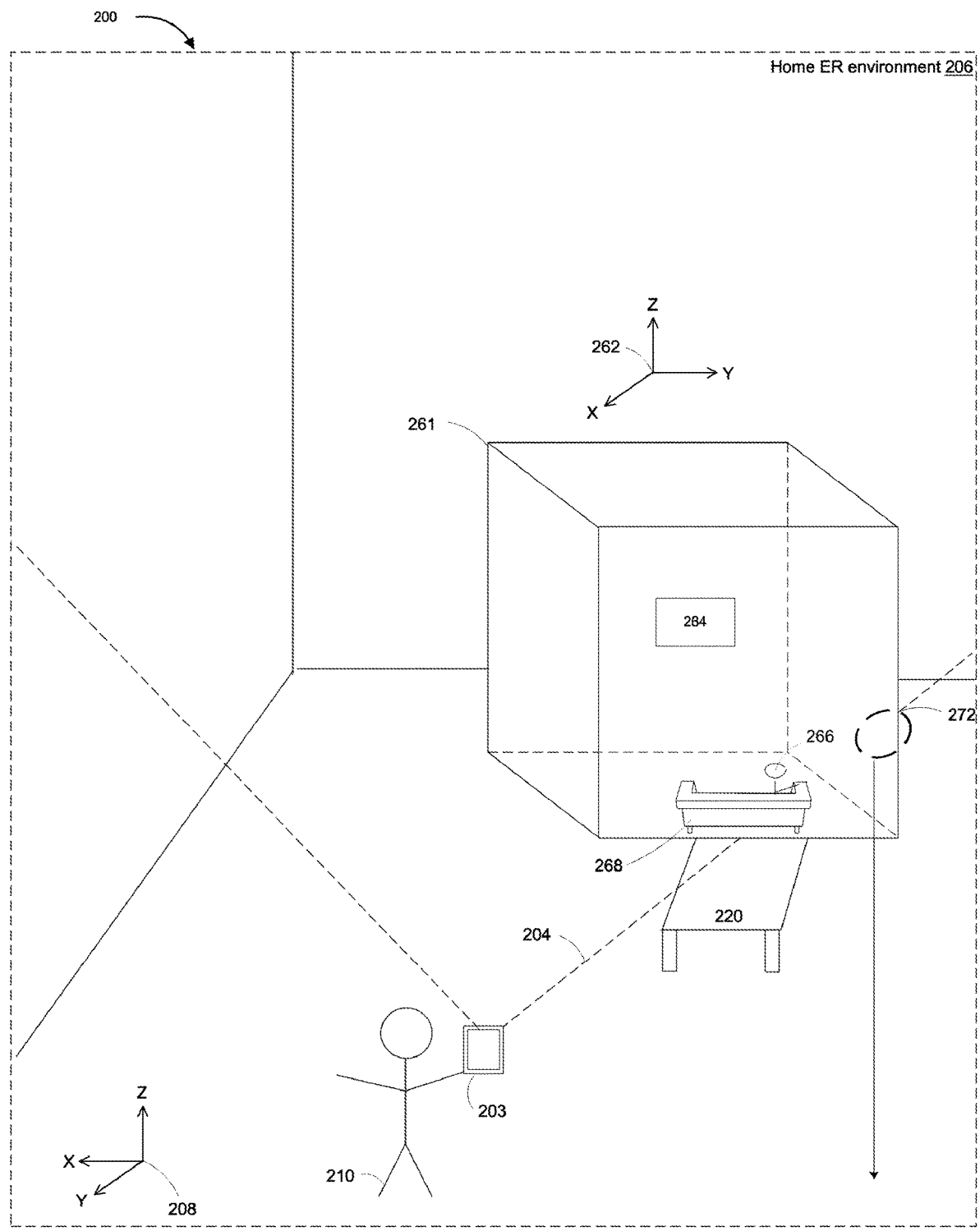
Figure 2S:
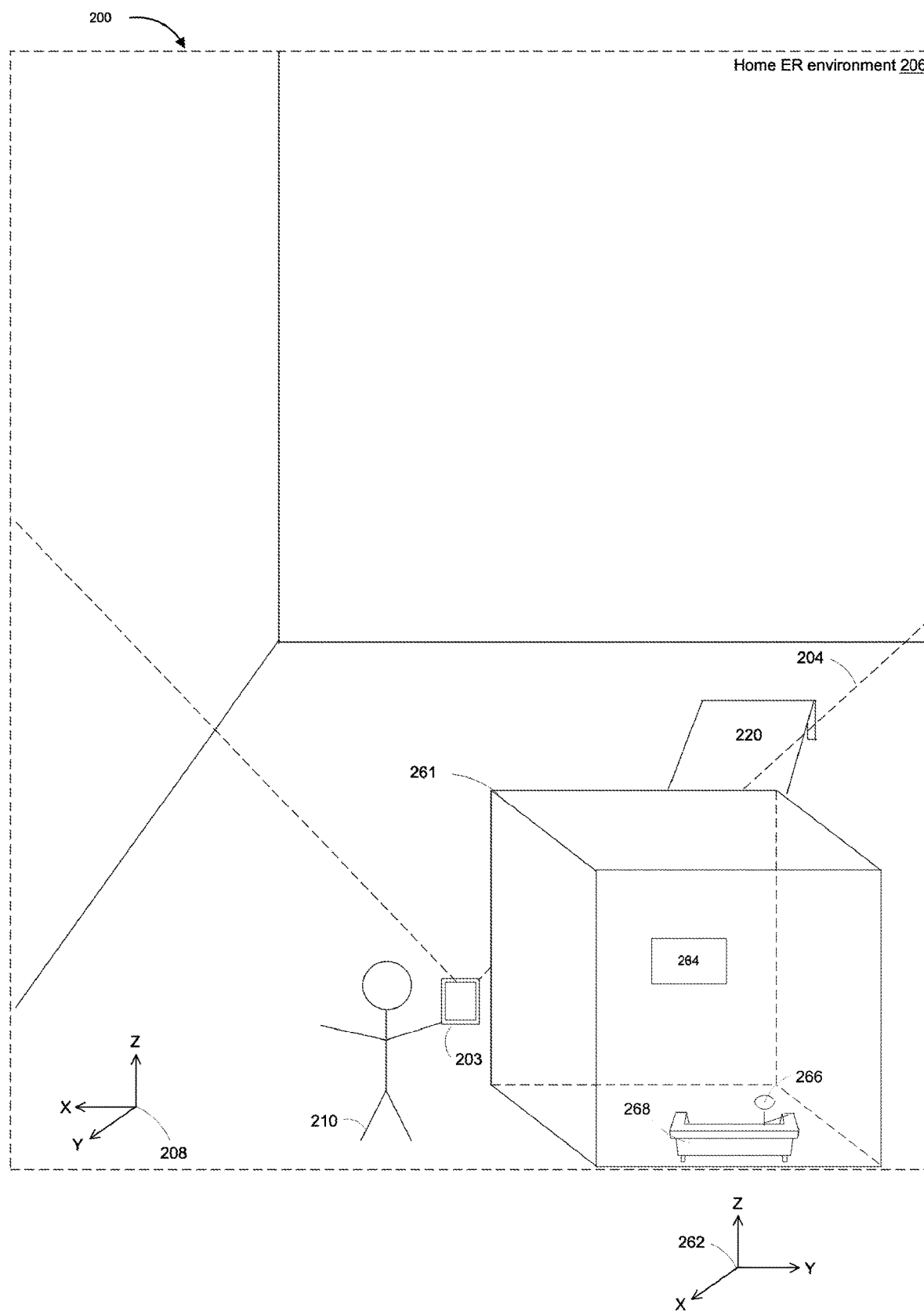
Figure 2T:
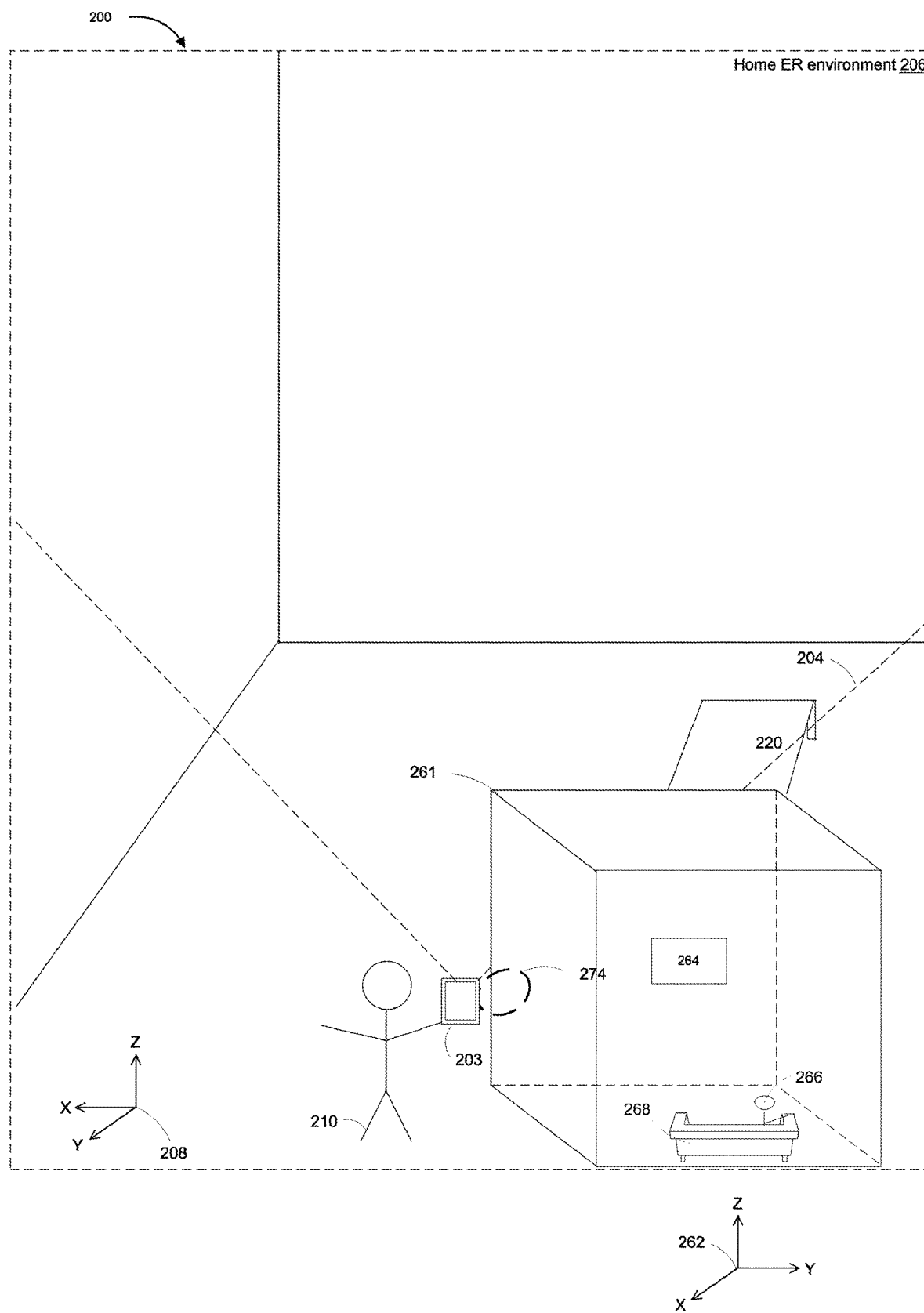
Figure 2U:
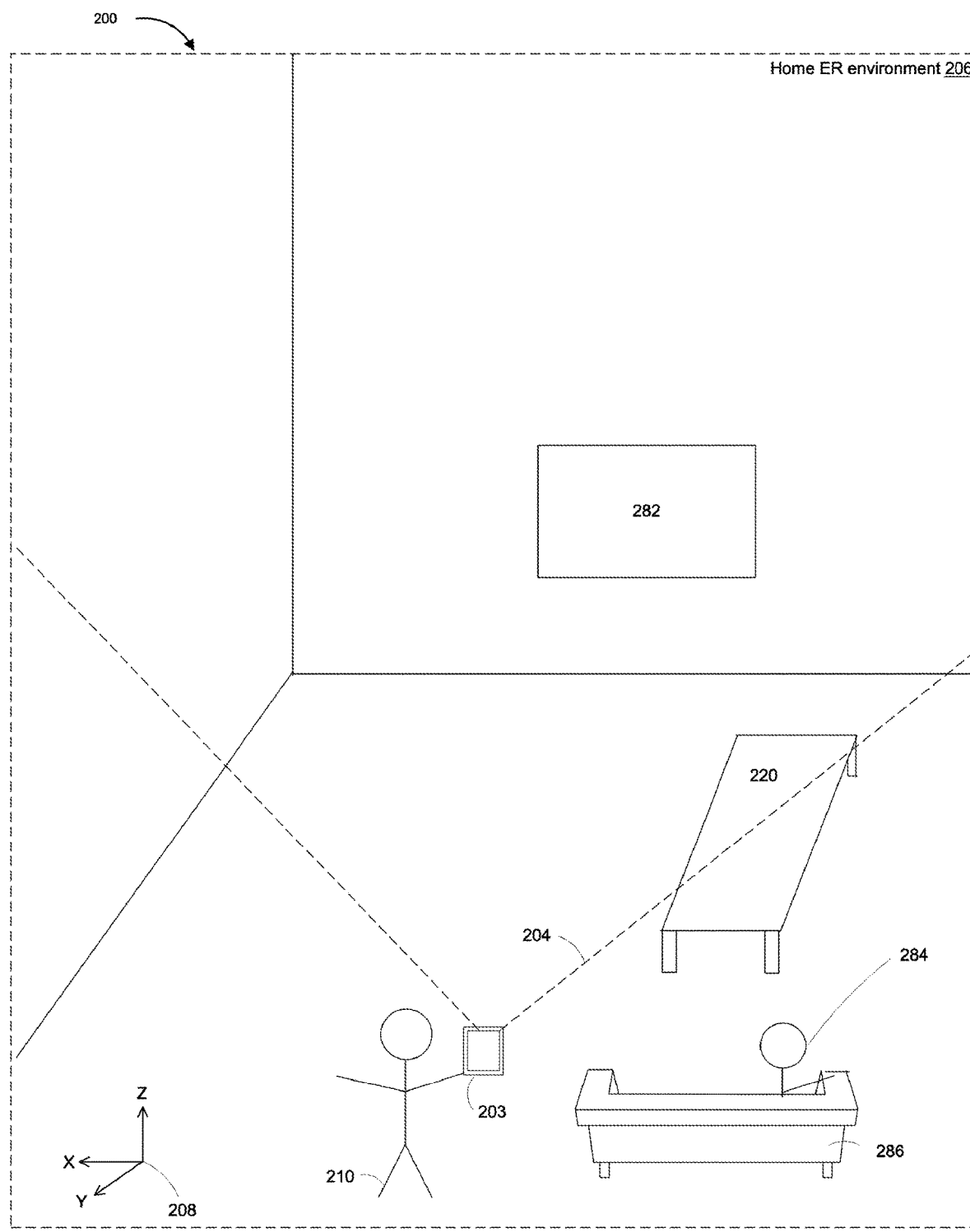
Figure 2V:
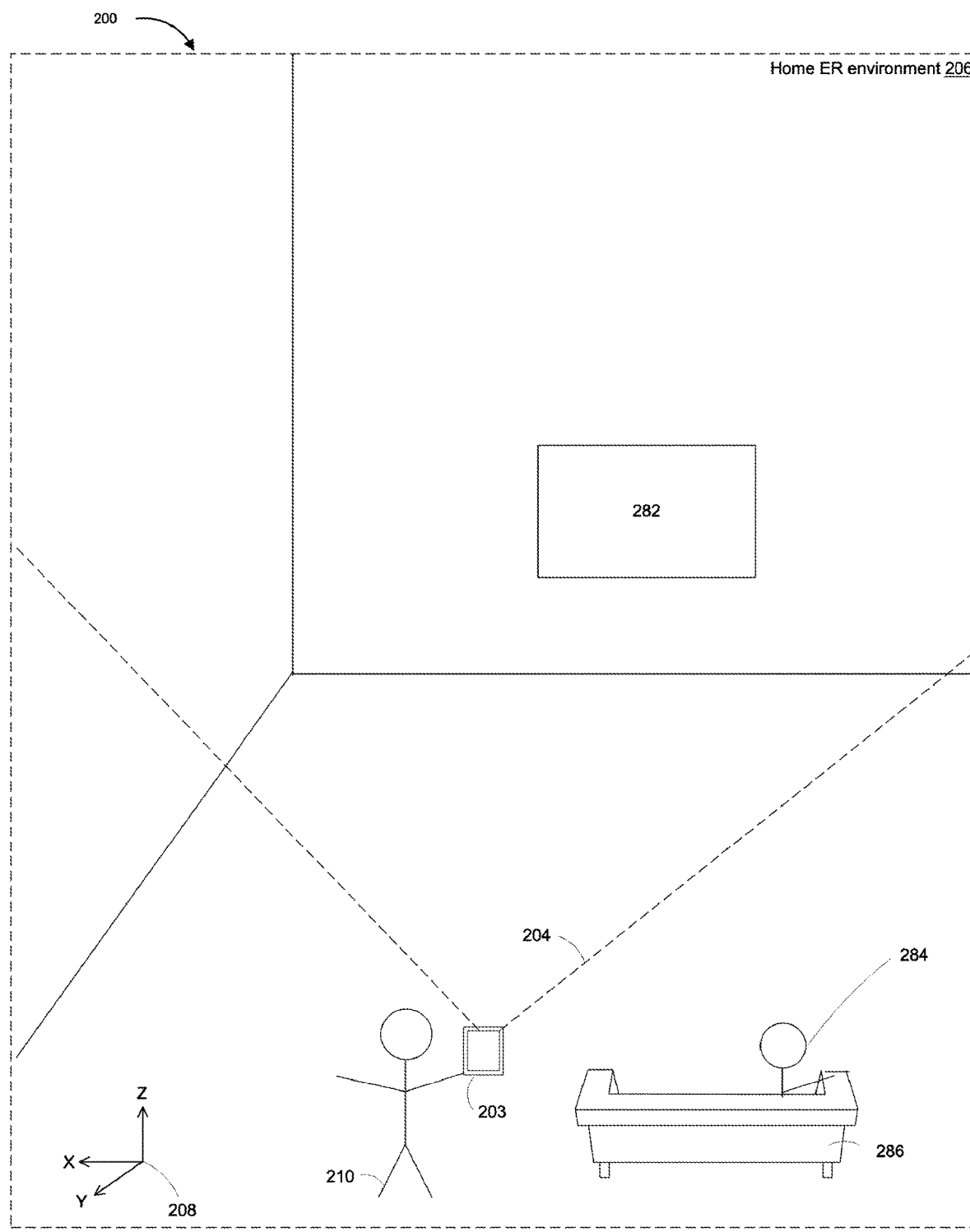

FIGS. 2A-2V are examples of an operating environment 200 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

To that end, as illustrated in FIG. 2A, the operating environment 200 includes an electronic device 203, which is being held by a user 210, and a physical table 220. In some implementations, the electronic device 203 corresponds to a mobile device, such as a smartphone, laptop, tablet, etc. In some implementations, the electronic device 203 is similar to and adapted from the electronic device 100 in FIG. 1. The electronic device 203 is associated with a field-of-view 204 associated with a portion of the operating environment 200.

According to various implementations, the electronic device 203 is configured to present a home ER environment 206 to the user 210. The home ER environment 206 is characterized by home ER world coordinates 208. In some implementations, the home ER world coordinates 208 define a set of points existing in a three-dimensional (3D) space. In some implementations, the home ER environment 206 corresponds to a purely virtual environment, and thus the electronic device 203 does not display the physical table 220 within the home ER environment 206, irrespective of the position of the electronic device 203 relative to the operating environment 200.

In some implementations, the home ER environment 206 corresponds to an AR environment. For example, in some implementations, the electronic device 203 is configured to present the home ER environment 206 and to enable video pass-through of at least a portion of physical objects within the operating environment 200 therein. As one example, with reference to FIG. 2F, after the user 210 wearing an electronic device 203 has rotated the orientation of the electronic device 203 towards the physical table 220, the electronic device 203 displays the physical table 220 within the home ER environment 206. As another example, in some implementations, the electronic device 203 includes a transparent or additive display that enables optical see-through of the operating environment 200 including physical objects within the operating environment 200.

The home ER environment 206 includes a first diorama-view representation 230 of a first ER environment and a second diorama-view representation 240 of a second ER environment. In some implementations, a diorama-view representation is representative of a purely virtual environment. On the other hand, in some implementations, a diorama-view representation is at least partially representative of a real environment. For example, in some implementations, a diorama-view representation includes structure features of a real environment, such as the walls, floor, and ceiling of a user's living room. As another example, in some implementations, a diorama-view representation includes physical objects that are within virtual structural features, such as a real table inside a virtual room.

The first diorama-view representation 230 includes one or more of ER objects arranged in a spatial relationship according to first ER world coordinates 232. For example, the first ER world coordinates 232 define a respective set of points existing in a 3D space. Namely, the first diorama-view representation 230 includes a television 234, an avatar 236, and a couch 238. The avatar 236 corresponds to a virtual representation of an individual that is associated with (e.g., connected to) the first ER environment. For example, in some implementations, the avatar 236 is associated with an ER session that enables graphical representations of individuals to be displayed within the first ER environment. In some implementations, the electronic device 203 dynamically updates the first diorama-view representation 230, such as playback of video content via the television 234 or movement of the avatar 236, in order to reflect changes within the first ER environment.

The second diorama-view representation 240 includes one or more of ER objects arranged in a spatial relationship according to second ER world coordinates 242. Namely, the second diorama-view representation 240 includes a credenza 244 and a chair 246. For example, the second ER world coordinates 242 define a respective set of points existing in a 3D space. One of ordinary skill in the art will appreciate that the diorama-view representations may include any number and types of ER objects arranged in a variety of ways. One of ordinary skill in the art will appreciate that the diorama-view representations may include any number of avatars.

In some implementations, the electronic device 203 corresponds to a head-mountable device (HMD) being worn by the user 210. The HMD presents the home ER environment 206 described above with reference to FIG. 2A. In some implementations, the HMD includes an image sensor that is associated with the field-of-view 204, and the HMD displays, within the home ER environment 206, AR content that includes physical objects. In some implementations, the HMD is similar to and adapted from the electronic device 100 in FIG. 1. In some implementations, the HMD is configured to present the home ER environment 206 and to enable video pass-through of at least a portion of physical objects within the operating environment 200 therein. As another example, in some implementations, the HMD includes a transparent or additive display enables optical see-through of the operating environment 200 including physical objects within the operating environment 200.

In some implementations, the HMD includes an integrated display (e.g., a built-in display) that displays the home ER environment 206. In some implementations, the HMD includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 203 illustrated in FIG. 2A). For example, in some implementations, the electronic device 203 slides/snaps into or otherwise attaches to the head-mountable enclosure. In some implementations, the display of the device attached to the head-mountable enclosure presents (e.g., displays) the home ER environment 206.

FIGS. 2B-2H illustrate changing respective perspective views of the first diorama-view representation 230 and the second diorama-view representation 240 based on various user inputs. As illustrated in FIG. 2B, the electronic device 203 detects an input 250 associated with the second diorama-view representation 240. The input 250 requests to move the second diorama-view representation 240 upward along the z-axis of the home ER world coordinates 208 to a position above the first diorama-view representation 230. For example, in some implementations, an eye tracking sensor of (e.g., integrated within) the electronic device 203 detects the input 250, wherein the input 250 corresponds to an eye gaze input that indicates that an eye gaze of the user 210 is directed towards the second diorama-view representation 240. As another example, in some implementations, a hand tracking sensor of (e.g., integrated within) the electronic device 203 detects the input 250, wherein the input 250 corresponds to a hand tracking motion made by the user 210 that is directed towards the second diorama-view representation 240.

In response to detecting the input 250 in FIG. 2B, the electronic device 203 changes display of the second diorama-view representation 240 from a first viewing vector to a second viewing vector by moving the second diorama-view representation 240 to a position above the first diorama-view representation 230, as illustrated in FIG. 2C. A viewing vector provides one or more of a field-of-view (FOV), pose/rotational coordinates, translational coordinates, perspective, and/or the like relative to the user 210 and the home ER coordinate system 208. While changing display of the second diorama-view representation 240 from the first viewing vector to the second viewing vector, the electronic device 203 maintains the credenza 244 and the chair 246 according to the second ER world coordinates 242. In other words, the electronic device 203 maintains the spatial relationship between the credenza 244 and the chair 246 within the second diorama-view representation 240. For example, as illustrated in FIGS. 2B and 2C, the longer edge of the credenza 244 runs substantially along (e.g., parallel to) the y-axis of the second ER world coordinates 242. As another example, as illustrated in FIGS. 2B and 2C, the bottom of the legs of the credenza 244 and the bottom of the legs of the chair 246 are at the z=0 location of the z-axis of the second ER world coordinates 242. As yet another example, the electronic device 203 maintains respective position of the credenza 244 and the chair 246 relative to each other along the x-y plane of the second ER world coordinates 242 in FIGS. 2B and 2C.

As illustrated in FIG. 2D, the electronic device 203 detects a movement input 251, such as via an IMU of the electronic device 203. The movement input 251 corresponds to the user 210 moving clockwise (as viewed from above) around the first diorama-view representation 230 and the second diorama-view representation 240 within the operating environment 200. In response to detecting the movement input 251 in FIG. 2D, the field-of-view 204 associated with the electronic device 203 and thus the displayed home ER environment 206 includes a portion of the physical table 220, as is illustrated in FIG. 2E.

In further response to detecting the movement input 251 in FIG. 2D, the electronic device 203 changes display of the first diorama-view representation 230 and the second diorama-view representation 240 according to the rotation of the home ER environment 206, as illustrated in FIG. 2E. Namely, the electronic device 203 rotates the first diorama-view representation 230 and the ER objects therein (e.g., the television 234, the avatar 236, and the couch 238) 90-degrees according to the corresponding rotation of the home ER world coordinates 208, as indicated by rotation of the first ER world coordinates 232 between FIG. 2D and FIG. 2E. For example, the view of the avatar 236 changes from a front-view of the avatar 236 in FIG. 2D to a side-view of the avatar 236 in FIG. 2E. While rotating the first diorama-view representation 230, the electronic device 203 maintains the television 234, the avatar 236, and the couch 238 according to the first ER world coordinates 232. In other words, the electronic device 203 maintains the spatial relationship between the television 234, the avatar 236, and the couch 238 within the first diorama-view representation 230.

Moreover, as illustrated in FIG. 2E, the electronic device 203 rotates the second diorama-view representation 240 and the ER objects therein (e.g., the credenza 244 and the chair 246) 90-degrees according to the corresponding rotation of the home ER world coordinates 208, as indicated by rotation of the second ER world coordinates 242 between FIG. 2D and FIG. 2E. For example, the view of the credenza 244 changes from a front-view of the credenza 244 in FIG. 2D to a side-view of the credenza 244 in FIG. 2E. While rotating the second diorama-view representation 240, the electronic device 203 maintains the credenza 244 and the chair 246 according to the second ER world coordinates 242. In other words, the electronic device 203 maintains the spatial relationship between the credenza 244 and the chair 246 within the second diorama-view representation 240.

As illustrated in FIG. 2F, the electronic device 203 detects a selection input 252 directed to the first diorama-view representation 230. For example, the selection input 252 is detected by an eye tracking sensor of the electronic device 203 or by a hand tracking sensor of the electronic device 203. In response to detecting the selection input 252 in FIG. 2F, the electronic device 203 ceases to display the second diorama-view representation 240 and maintains display of the first diorama-view representation 230, as illustrated in FIG. 2G.

As illustrated in FIG. 2H, the electronic device 203 detects a manipulation input 253 directed to the first diorama-view representation 230. The manipulation input 253 rotates the first diorama-view representation 230 90-degrees counterclockwise (as viewed from above) relative to the home ER world coordinates 208. Accordingly, as illustrated in FIGS. 2H and 2I, the first ER world coordinates 232 associated with the first diorama-view representation 230 rotate according to the manipulation input 253, whereas the home ER world coordinates 208 do not change. Accordingly, the respective views of the television 234, the avatar 236, and the couch 238 change from a side-view to a front-view between FIGS. 2H and 2I.

FIGS. 2J-2N illustrate functionality associated with an ER session that is associated with the first ER environment. The ER session enables respective graphical representations of individuals to be concurrently within the first ER environment. For example, the ER session enables a particular individual that is represented by the avatar 236 to be within the first ER environment. In some implementations, the electronic device 203 receives a request to join an ER session and displays a corresponding indication. For example, in some implementations, the indication corresponds to an ER join interface 254, as illustrated in FIG. 2J. Moreover, as illustrated in FIG. 2J, the electronic device 203 plays (e.g., via a speaker) a first set of speech data 256 that is associated with the particular individual that is associated with (e.g., connected to) the ER session. For example, the first set of speech data 256 is a verbal request to join the ER session, such as "Hey, Bob. Come join my ER environment and we can virtually watch TV together." As another example, the first set of speech data 256 include ambient noise associated with the first ER environment, such as noise from the television 234.

As illustrated in FIGS. 2K and 2L, the electronic device 203 displays an animation of the avatar 236 based on a corresponding movement of the particular individual. As illustrated in FIG. 2K, the avatar 236 moves from standing beside the couch 238 to sitting on the couch 238 facing the television 234, as is indicated by movement arrow 257, which is illustrated for purely explanatory purposes. Accordingly, as illustrated in FIG. 2L, the electronic device 203 displays the first diorama-view representation 230 with the avatar 236 having moved from beside the couch 238 to sitting on the couch 238 and facing the television 234.

As illustrated in FIG. 2M, the electronic device 203 obtains (e.g., via an audio sensor) a second set of speech data 258 from the user 210 and provides the second set of speech data 258 to the particular individual. For example, the second set of speech data 258 is a verbal affirmation to join the ER session, such as "Hey, Jill. Sure, I will join your ER environment. I want to watch the baseball game on TV."

FIGS. 2N-2V illustrate transforming a spatial relationship between a subset of the ER objects within the first diorama-view representation 230 as a function of the first ER world coordinates 232 and the home ER world coordinates 208. As illustrated in FIG. 2N, the first diorama-view representation 230 has a first height value indicated by a first reference measurement 260a, which is illustrated for purely explanatory purposes.

As illustrated in FIG. 2N, the electronic device 203 detects an acceptance input 259 that accepts the request to join the ER session. In response to detecting the acceptance input 259 in FIG. 2N, the electronic device 203: ceases to display the first diorama-view representation 230, transforms a subset of the ER objects within the first diorama-view representation 230 as a function of the first ER world coordinates 232 and the home ER world coordinates 208, and displays the subset of the ER objects based on the transformation, as illustrated in FIG. 2O. In some implementations, as illustrated in FIG. 2O, the electronic device 203 displays the subset of the ER objects within a bounded ER environment 261. As illustrated in FIG. 2O, the bounded ER environment 261 has a second height value indicated by a second reference measurement 260b, which is illustrated for purely explanatory purposes. Notably, as illustrated in FIG. 2O, the second height value indicated by the second reference measurement 260b is larger than the first height value indicated by the first reference measurement 260a. One of ordinary skill in the art will appreciate that other dimensional components (e.g., depth and width) of the bounded ER environment 261 are larger than corresponding dimensional components of the first diorama-view representation 230.

Displaying the bounded ER environment 261 may assist the user 210 in repositioning the subset of the ER objects in order to avoid physical objects and thus avoid visual obstructions, as will be described below. In some implementations, the electronic device 203 displays the subset of the ER objects without the bounded ER environment 261.

As illustrated in FIG. 2O, the subset of the ER objects includes a transformed television 264 that is based on the television 234, a transformed avatar 266 that is based on the avatar 236, and a transformed couch 268 that is based on the couch 238. The transformed television 264, the transformed avatar 266, and the transformed couch 268 are arranged according to transformed ER world coordinates 262 that are based on the first ER world coordinates 232. As compared with the first diorama-view representation 230 and the ER objects therein, the bounded ER environment 261 and the subset of the ER objects therein more accurately represent ER objects that may later be merged into or replace the home ER environment 206. For example, in some implementations, transforming the subset of the ER objects corresponds to enlarging each of the subset of the ER objects by a scaling factor. The scaling factor may be predetermined or may be specified by a user input. For example, in some implementations, the scaling factor corresponds to true-scale. In this example, the subset of the ER objects appears substantially equivalent to how they would after being merged into or replacing the home ER environment 206.

In some implementations, electronic device 203 arranges the transformed television 264, the transformed avatar 266, and the transformed couch 268 in order to match (within an error threshold) the corresponding arrangement of the television 234, the avatar 236, and the couch 238 within the first diorama-view representation 230 as defined by the first ER world coordinates 232 and the home ER world coordinates 208. For example, as compared with the corresponding ER objects within the first diorama-view representation 230 illustrated in FIG. 2N, the subset of the ER objects (264, 266, 268) illustrated in FIG. 2O are similarly located and oriented relative to each other.

In some implementations, transformation of the subset of the ER objects results in the relative distances between the transformed television 264, the transformed avatar 266, and the transformed couch 268 matching relative distances of the corresponding ER objects within the first diorama-view representation 230 within an error threshold.

In some implementations, transformation of the subset of the ER objects corresponds to changing resolutions of some or all of the subset of the ER objects. For example, in some implementations, the electronic device 203 performs object identification (e.g., semantic segmentation or object tracking) in order to identify dynamic ER objects (e.g., the avatar 236), and reduces resolutions of static ER objects (e.g., the couch 238).

In some implementations, the bounded ER environment 261 and the subset of the ER objects are obscured by one or more physical objects within the home ER environment 206. For example, as illustrated in FIG. 2O, the bounded ER environment 261 and the subset of the ER objects are initially displayed along a back wall of the home ER environment 206. Accordingly, were the user 210 to request to merge the subset of the ER objects into the home ER environment 206, the transformed television 264 would be behind and therefore blocked by the back wall, degrading the experience of the user 210. Accordingly, according to various implementations, the electronic device 203 enables movement of the subset of the ER objects in order to avoid physical obstructions.

For example, referring to FIG. 2P, the electronic device 203 detects an input 270 that corresponds to moving the bounded ER environment 261 and the subset of the ER objects therein away from the back wall of the home ER environment 206. In response to detecting the input 270 in FIG. 2P, the electronic device 203 moves the bounded ER environment 261 and the subset of the ER objects therein away from the back wall to above the physical table 220, as illustrated in FIG. 2Q. However, as illustrated in FIG. 2Q, the transformed avatar 266 and the transformed couch 268 obstruct a portion of the physical table 220.

As illustrated in FIG. 2R, the electronic device 203 detects an input 272 that corresponds to further moving the bounded ER environment 261 and the subset of the ER objects therein down along the z-axis of the home ER world coordinates 208 away from the physical table 220. In response to detecting the input 272 in FIG. 2R, the electronic device 203 moves the bounded ER environment 261 and the ER objects therein down along the z-axis of the home ER world coordinates 208. Accordingly, as illustrated in FIG. 2S, the transformed avatar 266 and the transformed couch 268 no longer obstruct the physical table 220, improving the experience of the user 210.

As illustrated in FIG. 2T, the electronic device 203 detects an input 274 directed to the bounded ER environment 261. The input 274 corresponds to a request to enter the first ER environment. In some implementations, in response to detecting the input 274 in FIG. 2T, the electronic device 203 adds a true-scale (e.g., full-size) television 282, a true-scale avatar 284, and a true-scale couch 286 to the home ER environment 206, as illustrated in FIG. 2U. Notably, as illustrated in FIG. 2U, the true-scale television 282 is within the field-of-view 204, but the true-scale avatar 284 and the true-scale couch 286 are not. However, were the user 210 to rotate the electronic device 203 clockwise 90 degrees (as viewed from above), such as by turning his or her head towards the true-scale avatar 284, then the true-scale avatar 284 and the true-scale couch 286 would be within the field-of-view 204.

In some implementations, adding the subset of the ER objects to the home ER environment 206 corresponds to resizing the subset of the ER objects to true-scale. As illustrated in FIG. 2U, the transformed avatar 266 and the transformed couch 268 do not obstruct the physical table 220. Accordingly, the user 210 may interact with the true-scale ER objects independent of providing additional inputs, leading to a more pleasant experience and reducing processor, memory, and battery utilization of the electronic device 203.

In some implementations, in response to detecting the input 274 in FIG. 2T, the electronic device 203 replaces the home ER environment 206 with the first ER environment 290, such as when the first ER environment 290 is a pure VR environment, as illustrated in FIG. 2V. The first ER environment 290 includes the true-scale television 282, the true-scale avatar 284, and the true-scale couch 286, but not the physical table 220.

Figure 3:
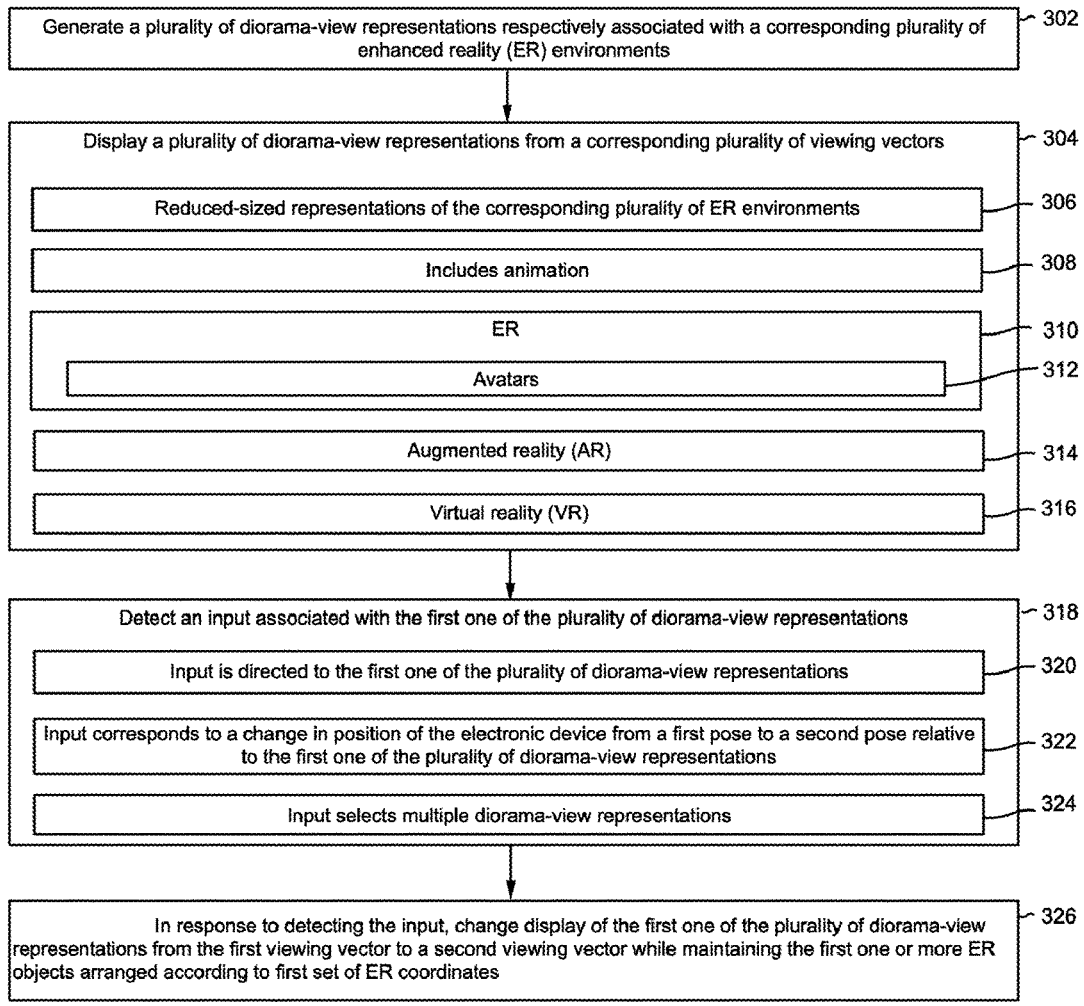
FIG. 3 is a flow diagram of a method of changing a perspective view of a diorama-view representation of an ER environment based on a user input in accordance with some implementations.

FIG. 3 is a flow diagram of a method 300 of changing a perspective view of a diorama-view representation of an ER environment based on a user input in accordance with some implementations. In various implementations, the method 300 or portions thereof are performed by an electronic device (e.g., the electronic device 100 in FIG. 1 or the electronic device 203 in FIGS. 2A-2V). In various implementations, the method 300 or portions thereof are performed by an HMD. In some implementations, the method 300 is performed by processing logic, including hardware, firmware, software, or a combination thereof. In some implementations, the method 300 is performed by a processor executing code stored in a non-transitory computer-readable medium (e.g., a memory). In various implementations, some operations in method 300 are, optionally, combined and/or the order of some operations is, optionally, changed.

As represented by block 302, in some implementations, the method 300 includes generating a plurality of diorama-view representations respectively corresponding to a plurality of ER environments. In some implementations, the method 300 includes obtaining a plurality of characterization vectors that respectively provide a plurality of spatial characterizations of the corresponding plurality of ER environments. Each of the plurality of characterization vectors includes a plurality of object label values that respectively identify one or more ER objects. Each of the plurality of characterization vectors also includes a plurality of relative position values providing respective positions of the one or more ER objects relative to each other. Moreover, the method 300 includes generating, from the corresponding plurality of ER environments and the plurality of characterization vectors, the plurality of diorama-view representations of the corresponding plurality of ER environments according to the relative position values. For example, an object label value may include instance object label values and/or semantic object label values. As another example, an object label value may include one sub-value or multiple sub-values. As yet example, a particular volumetric region of an ER environment may include three objects and thus has three corresponding object label values, such as "first object," "second object," and "third object." An object label value may be associated with an object and/or a feature thereof (e.g., table, chair, corner, edge, etc.). Moreover, an object label value may identify a moving object, such as an avatar of a particular individual within the ER environment. In some implementations, the spatial characterization corresponds to a volumetric (e.g., three-dimensional (3D)) characterization.

In some implementations, generating the plurality of diorama-view representations is based on a scaling factor, such as scaling down the corresponding plurality of ER environments by a scaling factor. For example, in some implementations, the scaling factor is predetermined. As another example, the scaling factor is obtained via a user input, such as an input that is directed to an affordance of a touch-sensitive surface of the electronic device or an input that corresponds to an eye gaze location of a user. As yet another example, in some implementations, the method 300 includes determining the scaling factor based on physical objects within a physical environment. To that end, in some implementations, the method 300 includes obtaining, via the image sensor, pass-through image data bounded by a field-of-view of a physical environment associated with the image sensor; identifying, within the pass-through image data, one or more physical objects within the physical environment; and determining the scaling factor based on the one or more physical objects. For example, the scaling factor may be based on respective positions and/or sizes (e.g., volumes) of the one or more physical objects, such as scaling down more when there are relatively large physical objects within the physical environment. In some implementations, the scaling factor is based on dimensions (e.g., volume) of a respective ER environment.

As represented by block 304, the method 300 includes displaying, via a display device, the plurality of diorama-view representations from a corresponding plurality of viewing vectors. The plurality of diorama-view representations corresponds to a plurality of enhanced reality (ER) environments. Each of the plurality of diorama-view representations is associated with a respective set of ER world coordinates that characterizes a respective ER environment. The plurality of diorama-view representations includes a first one of the plurality of diorama-view representations displayed from a first viewing vector. The first one of the plurality of diorama-view representations includes a first one or more of ER objects arranged according to a first set of ER world coordinates. As another example, each of the plurality of diorama-view representations corresponds to a bounded region associated with a respective set of ER world coordinates. The orientation, position, location, etc. of a particular plurality of ER objects within a corresponding diorama-view representation is based on the respective set of ER world coordinates. The ER objects may include a combination of movable inanimate objects (e.g., a chair or table), living objects (e.g., one or more avatars representing an individual), and inanimate structural objects (e.g., ceiling, wall, boundary of the diorama-view representation). In some implementations, the electronic device displays the plurality of diorama-view representations in accordance with determining satisfaction of a spatial proximity threshold. For example, diorama-view representations are spaced sufficiently far away from each other so as to avoid obscuring each other. A particular viewing vector provides one or more of: a field-of-view (FOV), pose/rotational coordinates, translational coordinates, a perspective, and/or the like.

In some implementations, the method 300 includes displaying the plurality of diorama-view representations within a home ER environment, such as the home ER environment 206 in FIGS. 2A-2V. As one example, with reference to FIG. 2A, the electronic device 203 displays a first diorama-view representation 230 of a first ER environment and a second diorama-view representation 240 of a second ER environment within the home ER environment 206. Continuing with this example, the first diorama-view representation 230 includes a television 234, an avatar 236, and a couch 238 arranged according to first ER world coordinates 232. Continuing with this example, the second diorama-view representation 240 includes a credenza 244 and a chair 246 arranged according to second ER world coordinates 242.

In some implementations, the method 300 includes displaying, within a particular one of the plurality of diorama-view representations, a recording of activity within a respective ER environment associated with the particular one of the plurality of diorama-view representations. In some implementations, the recording includes activity within the particular one of the plurality of diorama-view representations over a previous span of time. For example, the recording includes activity over the last day, indicating that five people entered and left a respective ER environment and three of those people drew on a whiteboard within the respective ER environment.

In some implementations, the electronic device displays the plurality of diorama-view representations based on control values. For example, the control values may be set via a user input. Control values may include, for example, a combination of whether or not to mute audio, whether a previewing user may communicate with individuals who have joined the first ER session, and/or whether the previewing user sees a history (e.g., log) of who has joined and left and when.

In some implementations, the electronic device displays the plurality of diorama-view representations based on eye gaze data. To that end, the method 300 includes obtaining eye gaze data indicative of an eye gaze location, wherein displaying the plurality of diorama-view representations is based on the eye gaze data. For example, an electronic device renders and displays a particular one of the plurality of diorama-view representation with high resolution (e.g., emphasized) when the eye gaze data indicates that the eye gaze location is closest to the particular one of the a plurality of diorama-view representation. As another example, the electronic device does not display another one of the plurality of diorama-view representation when the eye gaze data indicates that the eye gaze location has not been within a threshold distance from the other one of the plurality of diorama-view representation for a threshold amount of time. As yet another example, the electronic device ceases performing live updates on (e.g., keeping static) contents of a portion of the plurality of diorama-view representations that are not within a threshold distance from the eye gaze location.

As represented by block 306, in some implementations, the plurality of diorama-view representations corresponds to reduced-sized representations of the corresponding plurality of ER environments. As one example, the television 234 within the first diorama-view representation 230 illustrated in FIG. 2N corresponds to a reduced-sized version of the true-scale television 282 illustrated in FIG. 2U. In some implementations, the number of ER objects within a particular diorama-view representation is the same as or fewer than the number of ER objects with a corresponding ER environment. For example, the method 300 includes selectively rendering and/or displaying certain objects, such as displaying living objects (e.g., the avatar 236), but not rendering structural features (e.g., walls) of the home ER environment. In some implementations, the method 300 includes rendering different features of a particular diorama-view representation with different level of fidelity (e.g., resolution). By selectively rendering and/or displaying, an electronic device reduces utilization of processing and battery resources.

As represented by block 308, in some implementations, displaying the plurality of diorama-view representations includes animating a portion of the plurality of diorama-view representations. As one example, with reference to FIGS. 2K and 2L, the electronic device 203 displays movement of the avatar 236 because an individual associated with the avatar 236 is moving within his or her respective physical environment, causing a resulting movement of his or her avatar 236 within the ER environment.

As represented by block 310, in some implementations, at least a subset of the corresponding plurality of ER environments is respectively associated with a plurality of ER environments corresponding to a plurality of ER sessions. Each of the plurality of ER environments enables graphical representations of individuals to be concurrently within the ER environment. According to various implementations, each of the one or more corresponding individuals is associated with a respective access level that satisfies an access level criterion that is associated with the respective ER session, such as is managed by the privacy subsystem 170 in FIG. 1. Accordingly, for example, a particular individual who has no preexisting relationship with any of the individuals currently associated with an ER environment cannot view a corresponding diorama-view representation.

As represented by block 312, in some implementations, at least a subset of the plurality of diorama-view representations includes one or more ER representations (e.g., avatars) of one or more corresponding individuals. Each of the one or more corresponding individuals is associated with a respective ER session. As one example, with reference to FIG. 2A, the electronic device 203 displays an avatar 236 that is associated with an ER session, which, itself, is associated with the first ER environment. In some implementations, the method 300 includes providing two-way audio between an electronic device and an avatar within a diorama-view representation. To that end, the method 300 includes playing, via a speaker of the electronic device, a first set of speech data while displaying the plurality of diorama-view representations. The first set of speech data is associated with one or more corresponding individuals that are associated with a particular ER session associated with a respective ER environment. For example, the first set of speech data is uttered by the one or more corresponding individuals. As another example, the playback of the first set of speech data is in real time or is delayed via buffering. As yet another example, the first set of speech data may be spatialized so as to sound as though originating from within a diorama-view representation. Moreover, the method 300 includes obtaining, via an audio sensor of the electronic device, a second set of speech data from a user associated with the electronic device. Moreover, the method 300 includes providing the second set of speech data to the respective ER environment so that the second set of speech data is audible to the one or more corresponding individuals that are associated with the particular ER session. The second set of speech data may be presented to participants of respective ER environments in a variety of ways, such as spatialized audio from above the respective ER environments.

As represented by block 314, in some implementations, the first one of the plurality of diorama-view representations corresponds to an augmented reality (AR) representation of a first ER environment. For example, the first one of the plurality of diorama-view representations includes AR content overlaid on environmental data that is associated with physical features of an operating environment. For example, with reference to FIG. 2A, the couch 238 within the first diorama-view representation 230 may correspond to a physical couch that is associated with the first ER environment. In some implementations, the method 300 includes obtaining (e.g., via an image sensor) the environmental data (e.g., pass-through image data), generating ER objects, and overlaying the ER objects on the environmental data.

As represented by block 316, in some implementations, the first one of the plurality of diorama-view representations corresponds to a virtual reality (VR) representation of a first ER environment. For example, the second diorama-view representation 240, including structural objects (e.g., the floor and walls), the credenza 244, and the chair 246 correspond to ER objects.

As represented by block 318, the method 300 includes detecting, via one or more input devices, an input associated with the first one of the plurality of diorama-view representations. As represented by block 320, in some implementations, the input is directed to the first one of the plurality of diorama-view representations. As one example, with reference to FIG. 2H, the manipulation input 253 is directed to the first diorama-view representation 230. For example, the input changes the orientation of (e.g., rotating) the first one of the plurality of diorama-view representations. As another example, the input moves the first one of the plurality of diorama-view representations along an axis, such as translating the first one of the plurality of diorama-view representations along an x-y axis.

As represented by block 322, in some implementations, the input corresponds to a change in position of the electronic device from a first pose to a second pose relative to the first one of the plurality of diorama-view representations. As represented by block 324, in some implementations, the input is directed to multiple diorama-view representations. For example, the electronic device includes an IMU that detects positional changes of the electronic device. As one example, with reference to FIG. 2D, the electronic device 203 detects the movement input 251 that corresponds to the user 210 moving around the first diorama-view representation 230 and the second diorama-view representation 240 within the operating environment 200. In response to detecting the movement input 251, the electronic device 203 changes the first diorama-view representation 230 and the second diorama-view representation 240 from a first pose to a second pose.

As represented by block 326, the method 300 includes, in response to detecting the input, changing display of the first one of the plurality of diorama-view representations from the first viewing vector to a second viewing vector while maintaining the first one or more ER objects arranged according to the first set of ER world coordinates. As one example, with reference to FIGS. 2D and 2E, in response to detecting the movement input 251, the electronic device 203 correspondingly changes respective viewing vectors associated with the first diorama-view representation 230 and the second diorama-view representation 240, as indicated by respective changes to the first ER world coordinates 232 and the second ER world coordinates 242. As another example, with reference to FIGS. 2H and 2I, in response to detecting the manipulation input 253 directed to the first diorama-view representation 230, the electronic device 203 correspondingly rotates the first diorama-view representation 230, as indicated by a change to the first ER world coordinates 232 relative to the home ER world coordinates 208.

Figure 4:
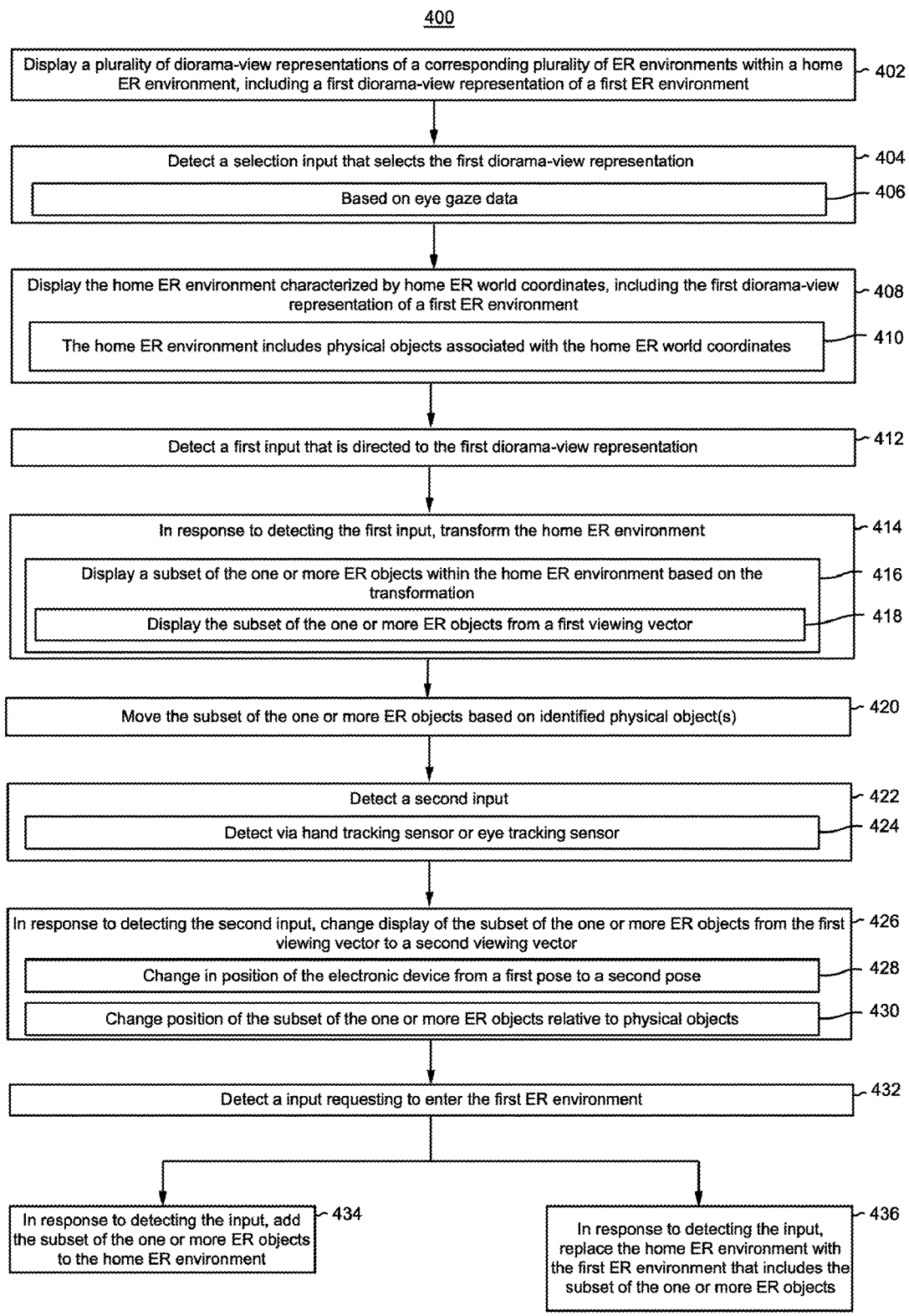
FIG. 4 is a flow diagram of a method of transforming a spatial relationship between a subset of ER objects as a function of respective coordinates associated with a corresponding diorama-view representation and home ER world coordinates in accordance with some implementations.

FIG. 4 is a flow diagram of a method 400 of transforming a spatial relationship between a subset of ER objects as a function of respective coordinates associated with a corresponding diorama-view representation and home ER world coordinates in accordance with some implementations. In various implementations, the method 400 or portions thereof are performed by an electronic device (e.g., the electronic device 100 in FIG. 1 or the electronic device 203 in FIGS. 2A-2V). In various implementations, the method 400 or portions thereof are performed by an HMD. In some implementations, the method 400 is performed by processing logic, including hardware, firmware, software, or a combination thereof. In some implementations, the method 400 is performed by a processor executing code stored in a non-transitory computer-readable medium (e.g., a memory). In various implementations, some operations in method 400 are, optionally, combined and/or the order of some operations is, optionally, changed.

As represented by block 402, in some implementations, the method 400 includes displaying a plurality of diorama-view representations of a corresponding plurality of ER environments within a home ER environment. The plurality of diorama-view representations includes a first diorama-view representation of a first ER environment. As one example, with reference to FIG. 2A, the electronic device 203 displays a first diorama-view representation 230 of a first ER environment and a second diorama-view representation 240 of a second ER environment within the home ER environment 206. Continuing with this example, the first diorama-view representation 230 includes a television 234, an avatar 236, and a couch 238 arranged according to first ER world coordinates 232. Continuing with this example, the second diorama-view representation 240 includes a credenza 244 and a chair 246 arranged according to second ER world coordinates 242.

In some implementations, as represented by block 404, the method 400 includes detecting a selection input that selects the first diorama-view representation from the plurality of diorama-view representations. As one example, with reference to FIG. 2F, the electronic device 203 detects the selection input 252 that is directed to the first diorama-view representation 230. In some implementations, as represented by block 406, the select input is based on eye gaze data obtained by, for example, an eye tracking sensor integrated within an electronic device or HMD. For example, the eye gaze data indicates that an eye gaze location of a user is directed to the first diorama-view representation of the plurality of diorama-view representations.

As represented by block 408, the method 400 includes displaying a home ER environment characterized by home ER world coordinates, including the first diorama-view representation of the first ER environment. The first diorama-view representation includes one or more of ER objects arranged in a spatial relationship according to first ER world coordinates. In some implementations, displaying the first diorama-view representation includes ceasing to display the remainder of the plurality of diorama-view representations. In some implementations, displaying the first diorama-view representation includes displaying the remainder of the plurality of diorama-view representations with a lower resolution than the first diorama-view representation. In some implementations, displaying the first diorama-view representation includes ceasing to perform live updates of contents of the first diorama-view representation. In some implementations, the first diorama-view representation corresponds to a reduced-size representation of the first ER environment. As an example, the one or more ER objects includes a combination of movable objects (e.g., a chair or table), living objects (e.g., one or more avatars representing respective individuals), structural objects (e.g., ceiling, wall, boundary of the diorama-view representation), anchored objects (e.g., a bookshelf), and/or the like. The orientation, position, location, etc. of the one or more ER objects is based on the first ER world coordinates. In some implementations, as represented by block 410, the home ER environment includes one or more physical objects associated with the home ER world coordinates. As one example, with reference to FIG. 2A, the home ER environment 206 includes a physical table 220.

As represented by block 412, the method 400 includes detecting a first input that is directed to the first diorama-view representation. As one example, with reference to FIG. 2N, the acceptance input 259 accepts an invitation to join an ER session associated with the first diorama-view representation 230. For example, the first input is associated with an interest to initiate (e.g., join or display) the first ER environment, such as a voice input, picking up or putting down the first diorama-view representation (e.g., as detected via a hand sensor), etc.

As represented by block 414, the method 400 includes, in response to detecting the first input, transforming the home ER environment. According to some implementations, transforming the home ER environment includes ceasing to display the first diorama-view representation within the home ER environment and transforming the spatial relationship between a subset of the one or more ER objects as a function of the home ER world coordinates and the first ER world coordinates. As represented by block 416, the method 400 includes displaying the subset of the one or more ER objects within the home ER environment based on the transformation. As one example, in response to detecting the acceptance input 259 that selects the first diorama-view representation 230 in FIG. 2N, the electronic device 203 displays the bounded ER environment 261 including the transformed television 264, the transformed avatar 266, and the transformed couch 268, as illustrated in FIG. 2O. For example, the subset of the one or more ER objects corresponds to respective representations of the corresponding ER objects. As another example, the subset of the one or more ER objects may include some or all of the one or more ER objects. In some implementations, transforming the spatial relationship includes increasing respective sizes of the subset of the one or more ER objects as compared with the same objects within the first diorama-view representation. In some implementations, transforming the spatial relationship includes increasing distances between the subset of the one or more ER objects as compared with the same objects within the first diorama-view representation, while maintaining relative distances between the subset of the one or more ER objects. For example, in the first diorama-view representation an ER stapler is 1 inch from an ER table and 3 inches from an ER wall and the transformation changes the distance between the ER stapler and the ER table to 2 inches and the distance between the ER stapler and the ER wall to 6 inches. In some implementations, transforming the spatial relationship includes moving the subset of the one or more ER objects relative to the home ER environment, such as dragging the subset of the one or more ER objects along an x-y axis. In some implementations, transforming the spatial relationship includes continuously increasing respective sizes of the subset of the one or more ER objects until true-scale representations of the subset of the one or more ER objects are achieved.

In some implementations, as represented by block 418, the method 400 includes, in response to detecting the first input, displaying the subset of the one or more ER objects from a first viewing vector. For example, the viewing vector provides one or more of: a field-of-view (FOV), pose/rotational coordinates, translational coordinates, a perspective, and/or the like.

In some implementations, as represented by block 420, the method 400 includes moving the subset of the one or more ER objects based on identified physical object(s). To that end, the method 400 includes obtaining, via an image sensor, environmental data (e.g., pass-through image data) bounded by a field-of-view associated with the image sensor, wherein the environmental data is associated with a physical environment including one or more physical objects. Moreover, the method 400 includes identifying, within the environmental data, a particular one of the one or more physical objects located within a spatial proximity threshold of the subset of the one or more ER objects and moving the subset of the one or more ER objects relative to the one or more physical objects based on the particular one of the one or more physical objects. For example, the method 400 includes identifying the particular one of the one or more physical objects via instance segmentation and/or semantic segmentation. As another example, the particular one of the one or more physical objects is larger than a volumetric threshold and thus is likely to obscure the subset of the one or more ER objects. In some implementations, the particular one of the one or more physical objects satisfies a spatial proximity threshold with respect to the subset of the one or more ER objects. For example, the spatial proximity threshold is satisfied when the particular one of the one or more physical objects is less than a threshold distance away from the subset of the one or more ER objects. In some implementations, the method 400 includes displaying an indicator that is indicative of the particular one of the one or more physical objects, such as a color overlay or animation that is on the surface of a portion of the particular one of the one or more physical objects (e.g., "do not move the ER environment downwards because there is a large wall there").

In some implementations, as represented by block 422, the method 400 includes detecting a second input. As one example, the second input is directed to the subset of the one or more ER objects. For example, the second input is directed to a separate affordance, such as pressing a left arrow in order to move a diorama-view representation leftwards. In some implementations, the second input has three degrees of freedom. For example, a diorama-view representation may be spun, rotated, and/or translated along an x-z plane, but not moved up or down in a y direction. In some implementations, the second input is detected via an inertial measurement unit (IMU), such as a gyroscope or accelerometer. As another example, the second input corresponds to a change in position of the electronic device from a first pose to a second pose relative to the subset of the one or more ER objects.

In some implementations, as represented by block 424, the second input is detected via a hand tracking sensor or an eye tracking sensor. To that end, in some implementations, the method 400 includes detecting the second input via the hand tracking sensor; obtaining hand tracking data from the hand tracking sensor based on the second input; and determining, from the hand tracking data, that the second input is directed to the subset of the one or more ER objects. For example, the method 400 includes comparing a hand position indicated by the hand tracking data against the position of the subset of the one or more ER objects. In some implementations, the method 400 includes detecting the second input via the eye tracking sensor; obtaining eye tracking data from the eye tracking sensor based on the second input; and determining, from the eye tracking data, that the second input is directed to the subset of the one or more ER objects. For example, the method 400 includes determining the second input is directed to the subset of the one or more ER objects by comparing an eye gaze position indicated by the eye gaze data against the position of the subset of the one or more ER objects.

In some implementations, as represented by block 426, the method 400 includes, in response to detecting the second input, changing display of the subset of the one or more ER objects from the first viewing vector to a second viewing vector while maintaining the subset of the one or more ER objects arranged according to the first ER world coordinates. For example, changing display of the subset of the one or more ER objects from the first viewing vector to a second viewing vector may include a combination of rotating, flipping, or moving along a fixed axis with a nominal amount of rotation, etc. As one example, in response to detecting the input 272 in FIG. 2R, the electronic device 203 moves the transformed television 264, the transformed avatar 266, and the transformed couch 268 from above the physical table 220 downwards along the z-axis of the home ER world coordinates 208 to the side of the physical table 220 in FIG. 2S. Continuing with this example, the electronic device 203 maintains arrangement of the transformed television 264, the transformed avatar 266, and the transformed couch 268 according to the transformed ER world coordinates 262. In some implementations, as represented by block 428, changing display of the subset of the one or more ER objects from the first viewing vector to the second viewing vector is based on the change in position of the electronic device from a first pose to a second pose. In some implementations, as represented by block 430, changing display of the subset of the one or more ER objects from the first viewing vector to the second viewing vector includes moving the subset of the one or more ER objects relative to the one or more physical objects.

In some implementations, as represented by block 432, the method 400 includes detecting an input requesting to enter the first ER environment. As one example, with reference to FIG. 2T, the input 274 is directed to the bounded ER environment 261 and corresponds to a request to enter the bounded ER environment 261. For example, the input 274 corresponds to one of an eye gaze input, a hand gesture, a voice input, a touch input, and/or the like. As another example, the input 274 corresponds to placing or dropping a diorama-view representation on the ground in order to enable the diorama-view representation expand to true-scale or in order to enable the diorama-view representation replace the current environment.

In some implementations, as represented by block 434, the method 400 includes, in response to detecting the input requesting to enter the first ER environment, adding the subset of the one or more ER objects to the home ER environment. As one example, in response to detecting the input 274 in FIG. 2T, the electronic device 203 adds the transformed television 264, the transformed avatar 266, and the transformed couch 268 to the home ER environment 206 including the physical table 220, as illustrated in FIG. 2U. In some implementations, adding the subset of the one or more ER objects to the home ER environment includes overlaying the subset of the one or more ER objects on physical objects within the home ER environment. In some implementations, adding the subset of the one or more ER objects to the home ER environment includes skinning physical features (e.g., structural features, such as walls, floor) of the first ER environment and adding the physical features, in addition to adding the subset of the one or more ER objects, to the home ER environment.

In some implementations, as represented by block 436, the method 400 includes, in response to detecting the input requesting to enter the first ER environment, replacing the home ER environment with the first ER environment that includes the subset of the one or more ER objects. For example, replacing the home ER environment with the first ER environment corresponds to replacing the home ER environment with a purely VR environment. As one example, in response to detecting the input 274 in FIG. 2T, the electronic device 203 replaces the home ER environment 206 with the first ER environment 290, as illustrated in FIG. 2V. As contrasted with the home ER environment 206 illustrated in FIG. 2U, the first ER environment 290 corresponds to a purely VR environment and thus does not include the physical table 220.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device including one or more processors, a non-transitory memory, one or more input devices, and a display device:
displaying, via the display device, a home enhanced reality (ER) environment characterized by home ER world coordinates, wherein the home ER environment includes a first diorama-view representation of a first ER environment different from the home ER environment, wherein the first diorama-view representation includes one or more of ER objects arranged in a spatial relationship according to first ER world coordinates different from the home ER world coordinates, and wherein the one or more of ER objects are associated with a first appearance while displayed within the first diorama-view representation of the first ER environment;
detecting, via the one or more input devices, a first input that is directed to the first diorama-view representation; and
in response to detecting the first input, transforming the home ER environment by:
ceasing to display the first diorama-view representation within the home ER environment,
transforming the spatial relationship between a subset of the one or more ER objects as a function of the home ER world coordinates and the first ER world coordinates, and
displaying, via the display device, the subset of the one or more ER objects within the home ER environment based on the transformation, and wherein the subset of one or more of ER objects are associated with a second appearance different from the first appearance while displayed within the home ER environment.

2. The method of claim 1, further comprising:
while displaying the subset of the one or more ER objects within the home ER environment based on the transformation, detecting, via the one or more input devices, a second input; and
in response to detecting the second input, adding the subset of the one or more ER objects to the home ER environment.

3. The method of claim 1, further comprising:
while displaying the subset of the one or more ER objects within the home ER environment based on the transformation, detecting, via the one or more input devices, a second input; and
in response to detecting the second input, replacing the home ER environment with the first ER environment that includes the subset of the one or more ER objects.

4. The method of claim 1, wherein, in response to detecting the first input, displaying the subset of the one or more ER objects from a first viewing vector, the method further comprising:
while displaying the subset of the one or more ER objects within the home ER environment based on the transformation, detecting, via the one or more input devices, a second input; and
in response to detecting the second input, changing display of the subset of the one or more ER objects from the first viewing vector to a second viewing vector while maintaining the subset of the one or more ER objects arranged according to the first ER world coordinates.

5. The method of claim 4, wherein the second input is directed to the subset of the one or more ER objects.

6. The method of claim 5, wherein the one or more input devices includes a hand tracking sensor, the method further comprising:
detecting the second input via the hand tracking sensor;
obtaining hand tracking data from the hand tracking sensor based on the second input; and
determining, from the hand tracking data, that the second input is directed to the subset of the one or more ER objects.

7. The method of claim 5, wherein the one or more input devices includes an eye tracking sensor, the method further comprising:
detecting the second input via the eye tracking sensor;
obtaining eye tracking data from the eye tracking sensor based on the second input; and
determining, from the eye tracking data, that the second input is directed to the subset of the one or more ER objects.

8. The method of claim 4, wherein the home ER environment includes one or more physical objects that are associated with the home ER world coordinates, and wherein changing display of the subset of the one or more ER objects from the first viewing vector to the second viewing vector includes moving the subset of the one or more ER objects relative to the one or more physical objects.

9. The method of claim 4, wherein the second input corresponds to a change in position of the electronic device from a first pose to a second pose relative to the subset of the one or more ER objects, and wherein changing display of the subset of the one or more ER objects from the first viewing vector to the second viewing vector is based on the change in position of the electronic device from the first pose to the second pose.

10. The method of claim 1, further comprising:
obtaining, via an image sensor, environmental data bounded by a field-of-view associated with the image sensor, wherein the environmental data is associated with a physical environment including one or more physical objects;
identifying, within the environmental data, a particular one of the one or more physical objects located within a spatial proximity threshold of the subset of the one or more ER objects; and
moving the subset of the one or more ER objects relative to the one or more physical objects based on the particular one of the one or more physical objects.

11. The method of claim 1, further comprising:
displaying, via the display device, a plurality of diorama-view representations of a corresponding plurality of ER environments within the home ER environment, wherein the plurality of diorama-view representations includes the first diorama-view representation; and
in response to detecting the first input, selecting the first diorama-view representation from the plurality of diorama-view representations.

12. The method of claim 1, further comprising:
displaying, via the display device, a plurality of diorama-view representations of a corresponding plurality of ER environments within the home ER environment, wherein the plurality of diorama-view representations includes the first diorama-view representation; and detecting, via the one or more input devices, a selection input that selects the first diorama-view representation from the plurality of diorama-view representations; and in response to detecting the selection input, maintaining display of the first diorama-view representation within the home ER environment and ceasing to display the remainder of the plurality of diorama-view representations.

13. The method of claim 12, further comprising obtaining, via an eye tracking sensor, eye gaze data indicative of an eye gaze location, wherein the selection input is based on the eye gaze location.

14. The method of claim 1, wherein the first ER environment is associated with an ER session that enables respective graphical representations of individuals to be concurrently within the first ER environment.

15. The method of claim 14, wherein the first ER environment includes one or more ER representations respectively associated with one or more individuals that are connected to the ER session.

16. The method of claim 15, wherein each of the one or more individuals has a respective access level that satisfies an access level criterion that is associated with the ER session.

17. The method of claim 15, further comprising:
while displaying the first diorama-view representation:
playing, via a speaker of the electronic device, a first set of speech data that is associated with the one or more individuals that are connected to the ER session;
obtaining, via an audio sensor of the electronic device, a second set of speech data from a user that is associated with the electronic device; and
providing the second set of speech data to the one or more individuals that are connected to the ER session.

18. The method of claim 1, further comprising:
obtaining a characterization vector that provides a spatial characterization of the first ER environment, wherein the characterization vector includes a plurality of object label values that respectively identify the one or more ER objects, and wherein the characterization vector also includes a plurality of relative position values providing respective positions of the one or more ER objects relative to each other; and
generating, from the first ER environment and the characterization vector, the first diorama-view representation.

19. An electronic device comprising:
one or more processors;
a non-transitory memory;
one or more input devices;
a display device; and
one or more programs, wherein the one or more programs are stored in the non-transitory memory and configured to be executed by the one or more processors, the one or more programs including instructions for:
displaying, via the display device, a home enhanced reality (ER) environment characterized by home ER world coordinates, wherein the home ER enviromnet includes a first diorama-view representation of a first ER environment different from the home ER environment, wherein the first diorama-view representation includes one or more of ER objects arranged in a spatial relationship according to first ER world coordinate different the home ER world coordinates, and wherein the one or more of ER objects are associated with a first appearance while displayed within the first diorama-view representation of the first ER environment;

detecting, via the one or more input devices, a first input that is directed to the first diorama-view representation; and in response to detecting the first input, transforming the home ER environment by:
ceasing to display the first diorama-view representation within the home ER environment,
transforming the spatial relationship between a subset of the one or more ER objects as a function of the home ER world coordinates and the first ER world coordinates, and
displaying, via the display device, the subset of the one or more ER objects within the home ER environment based on the transformation, and wherein the subset of one or more of ER objects are associated with a second appearance different from the first appearance while displayed within the home ER environment.

20. The electronic device of claim 19, wherein the one or more programs further include instructions for:
while displaying the subset of the one or more ER objects within the home ER environment based on the transformation, detecting, via the one or more input devices, a second input; and
in response to detecting the second input, adding the subset of the one or more ER objects to the home ER environment.

21. The electronic device of claim 19, wherein the one or more programs further include instructions for:
while displaying the subset of the one or more ER objects within the home ER environment based on the transformation, detecting, via the one or more input devices, a second input; and
in response to detecting the second input, replacing the home ER environment with the first ER environment that includes the subset of the one or more ER objects.

22. A non-transitory computer readable storage medium storing one or more programs, the one or more programs comprising instructions, which, when executed by an electronic device including one or more input devices and a display device, cause the electronic device to:
display, via the display device, a home enhanced reality (ER) environment characterized by home ER world coordinates, including a first diorama-view representation of a first ER environment different from the home ER environment, wherein the first diorama-view representation includes one or more of ER objects arranged in a spatial relationship according to first ER world coordinates, and wherein the one or more of ER objects are associated with a first appearance while displayed within the first diorama-view representation of the first ER environment;

detect, via the one or more input devices, a first input that is directed to the first diorama-view representation; and in response to detecting the first input, transform the home ER environment by:
ceasing to display the first diorama-view representation within the home ER environment,
transforming the spatial relationship between a subset of the one or more ER objects as a function of the home ER world coordinates and the first ER world coordinates, and
displaying, via the display device, the subset of the one or more ER objects within the home ER environment based on the transformation, and wherein the subset of one or more of ER objects are associated with a second appearance different from the first appearance while displayed within the home ER environment.

23. The non-transitory computer readable storage medium of claim 22, wherein the one or more programs further cause the electronic device to:
   while displaying the subset of the one or more ER objects within the home ER environment based on the transformation, detect, via the one or more input devices, a second input; and
   in response to detecting the second input, add the subset of the one or more ER objects to the home ER environment.

24. The non-transitory computer readable storage medium of claim 22, wherein the one or more programs further cause the electronic device to:
   while displaying the subset of the one or more ER objects within the home ER environment based on the transformation, detect, via the one or more input devices, a second input; and
   in response to detecting the second input, replace the home ER environment with the first ER environment that includes the subset of the one or more ER objects.

\* \* \* \* \*